(12) United States Patent
Ono

(10) Patent No.: US 11,182,940 B2
(45) Date of Patent: Nov. 23, 2021

(54) INFORMATION PROCESSING DEVICE, INFORMATION PROCESSING METHOD, AND PROGRAM

(71) Applicant: SONY CORPORATION, Tokyo (JP)

(72) Inventor: Junya Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/560,376

(22) PCT Filed: Jan. 14, 2016

(86) PCT No.: PCT/JP2016/051046
§ 371 (c)(1),
(2) Date: Sep. 21, 2017

(87) PCT Pub. No.: WO2016/157936
PCT Pub. Date: Oct. 6, 2016

(65) Prior Publication Data
US 2018/0068476 A1  Mar. 8, 2018

(30) Foreign Application Priority Data
Mar. 31, 2015 (JP) .............................. JP2015-072407

(51) Int. Cl.
*G06T 11/60* (2006.01)
*H04N 5/64* (2006.01)
(Continued)

(52) U.S. Cl.
CPC .............. *G06T 11/60* (2013.01); *G06F 3/011* (2013.01); *G06F 3/013* (2013.01); *G06F 3/017* (2013.01);
(Continued)

(58) Field of Classification Search
CPC ..... G02B 27/00–648; G02B 2027/0105–0198; G02B 27/0172;
(Continued)

(56) References Cited

U.S. PATENT DOCUMENTS

| 6,204,828 B1* | 3/2001 | Amir ....................... G06F 3/013 345/156 |
| 2006/0072215 A1* | 4/2006 | Nishi ...................... G02B 13/06 359/708 |

(Continued)

FOREIGN PATENT DOCUMENTS

| JP | 09-179062 | 7/1997 |
| JP | 2001-078998 | 3/2001 |

(Continued)

*Primary Examiner* — Stephen G Sherman
*Assistant Examiner* — Aaron Midkiff
(74) *Attorney, Agent, or Firm* — Paratus Law Group, PLLC

(57) ABSTRACT

There is provided an information processing device capable of securing the field of view of the user, the information processing device including: an image acquiring unit configured to acquire a field-of-view image corresponding to a field of view of a user; a hand detecting unit configured to detect a hand of the user from the field-of-view image; a background image generating unit configured to generate a background image of a background which is not visible to the user due to the hand on the basis of the field-of-view image; and an output image generating unit configured to generate a display image in which the background image is superimposed on an area occupied by the hand in the field of view of the user.

17 Claims, 34 Drawing Sheets

A

D

E

B

C

(51) Int. Cl.
  *G06F 3/0484* (2013.01)
  *G06F 3/0481* (2013.01)
  *G06F 3/01* (2006.01)
  *G06F 3/0346* (2013.01)
(52) U.S. Cl.
  CPC .......... *G06F 3/0346* (2013.01); *G06F 3/0484* (2013.01); *G06F 3/04815* (2013.01); *H04N 5/64* (2013.01)
(58) Field of Classification Search
  CPC ........ G02B 27/0176; G02B 2027/0174; G02B 2027/0178; G02B 27/017–0179; G02B 2027/178; G06F 3/013; G06F 3/01–018; G06F 3/011; G06F 3/017; G06F 3/0346; G06F 3/04815; G06F 3/0484; G06T 19/006; G06T 5/00–50; G06T 11/60; G06K 9/00671; H04N 5/20–28; H04N 5/64
  USPC .................................................. 345/633, 7–9
  See application file for complete search history.

(56) References Cited

U.S. PATENT DOCUMENTS

| | | | | |
|---|---|---|---|---|
| 2006/0209194 A1* | 9/2006 | Liu | ........................ | H04N 5/232 348/218.1 |
| 2011/0128349 A1* | 6/2011 | Theobald | ........... | H04N 5/23238 348/36 |
| 2011/0221657 A1* | 9/2011 | Haddick | .............. | G02B 27/017 345/8 |
| 2012/0162248 A1* | 6/2012 | Francois | ................... | G06T 5/50 345/620 |
| 2012/0183137 A1* | 7/2012 | Laughlin | ................ | H04N 7/185 380/200 |
| 2012/0200602 A1* | 8/2012 | Brown | ................ | G06F 3/04895 345/633 |
| 2015/0062000 A1* | 3/2015 | Saito | .................... | G02B 27/017 345/156 |
| 2015/0070386 A1* | 3/2015 | Ferens | .................... | G06F 3/011 345/633 |
| 2015/0077416 A1* | 3/2015 | Villmer | ................ | G02B 27/017 345/419 |
| 2015/0324645 A1* | 11/2015 | Jang | ........................ | G06F 3/012 345/633 |
| 2015/0338651 A1* | 11/2015 | Wang | ..................... | G06F 1/163 345/8 |
| 2016/0050345 A1* | 2/2016 | Longbotham | ........ | G02B 27/017 348/47 |
| 2016/0299569 A1* | 10/2016 | Fisher | .................. | G02B 27/017 |

FOREIGN PATENT DOCUMENTS

| | | |
|---|---|---|
| JP | 2006-048468 | 2/2006 |
| JP | 2010-067083 | 3/2010 |
| JP | 2013-521576 | 6/2013 |
| JP | 2015-504616 | 2/2015 |

* cited by examiner

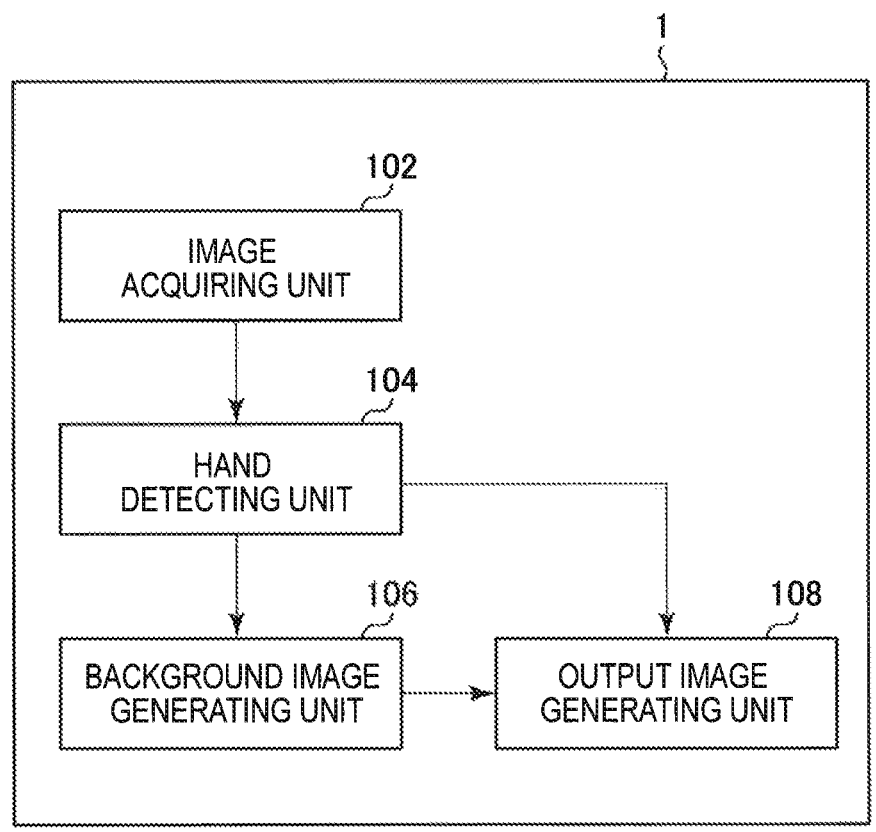

FIG. 3A
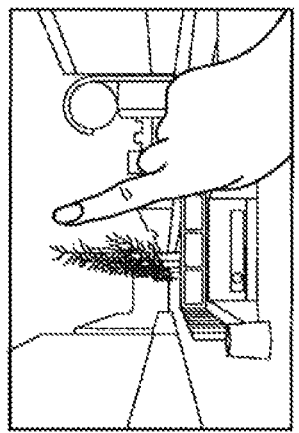
A
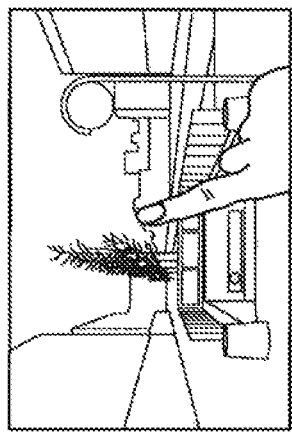
E
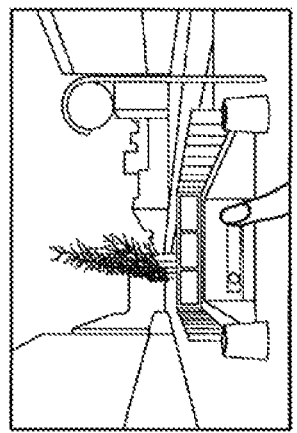
C
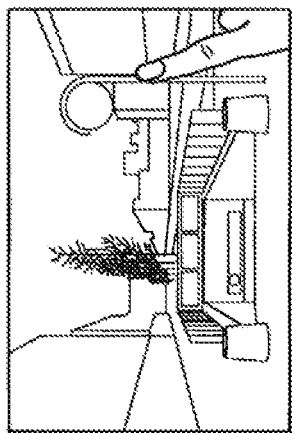
D
B

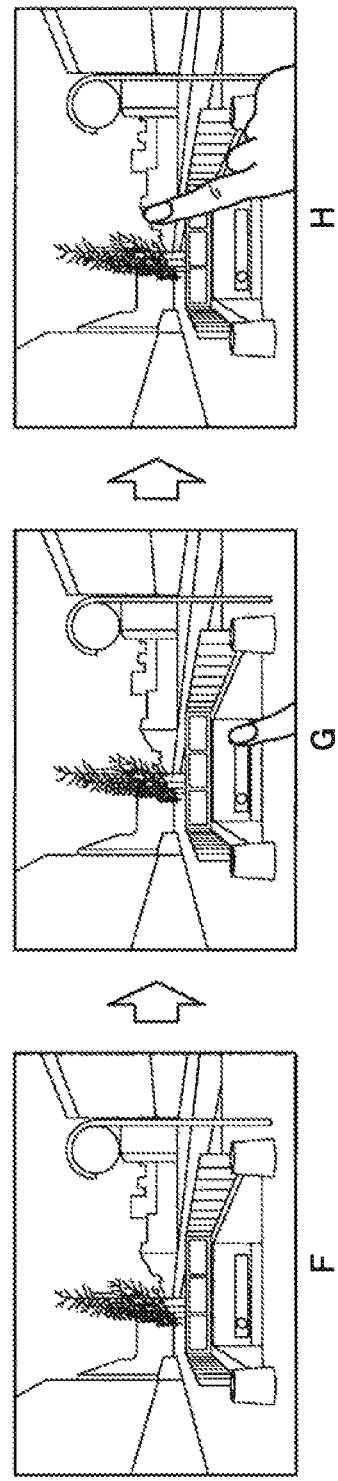

240
242

| FUNCTION | POINTER OBJECT |
|---|---|
| MOVEMENT | ↖ |
| SELECTION | ☝ |
| CHARACTER INPUT | ✏ |
| RANGE SELECTION | ✂ |
| INFORMATION ACQUISITION | 🔍? |
| ENLARGEMENT/ REDUCTION | 🔍+ 🔍− |

FIG. 23

| DISCLOSURE SCOPE LEVEL 1: LOW, 4: HIGH | SCOPE SETTING | DESCRIPTION |
|---|---|---|
| 1 | DISCLOSURE TO ALL | ANYONE |
| 2 | FRIENDS OF FRIENDS | UP TO FRIENDS OF FRIENDS |
| 3 | FRIENDS | ONLY FRIENDS OF USER |
| 4 | FAMILY | WITHIN FAMILY |
| DESIGNATION | CUSTOM | ONLY DESIGNATED USERS |

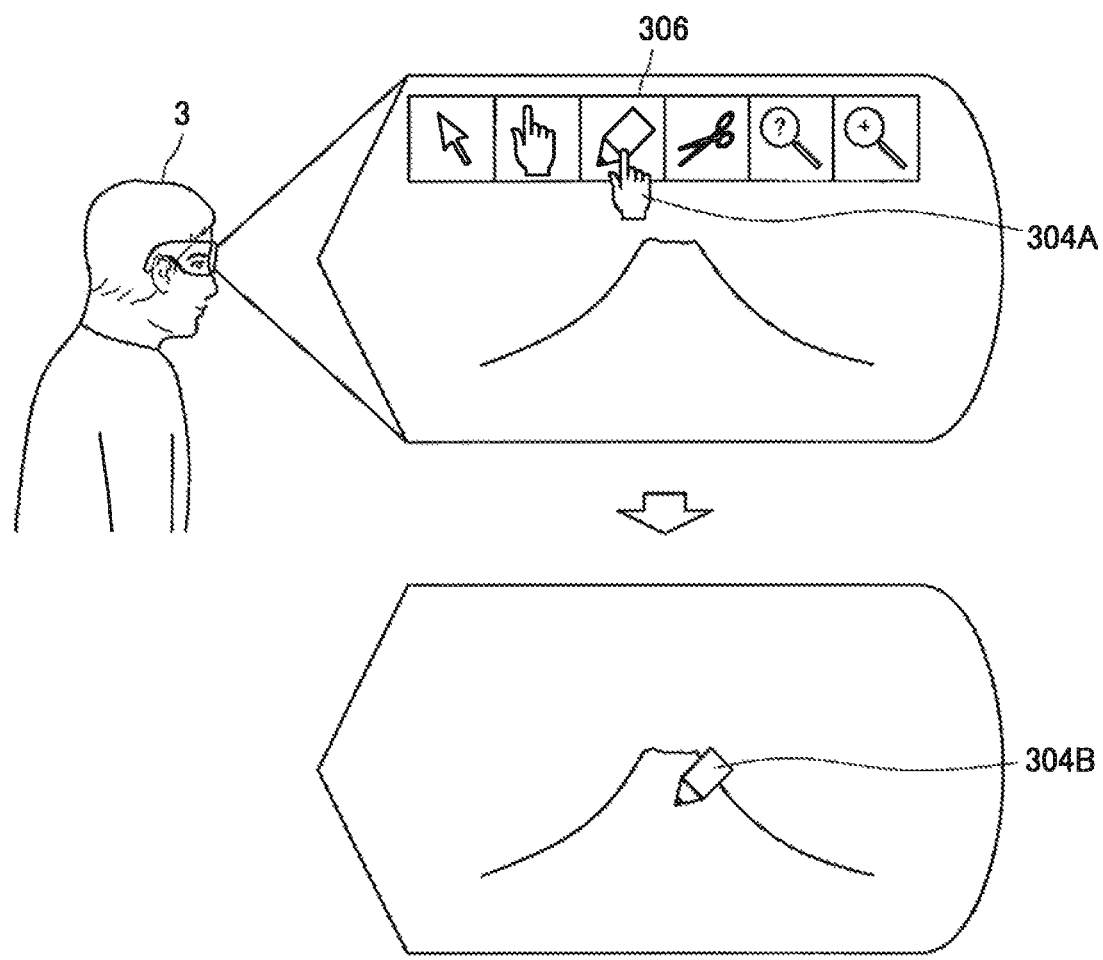

FIG. 27A
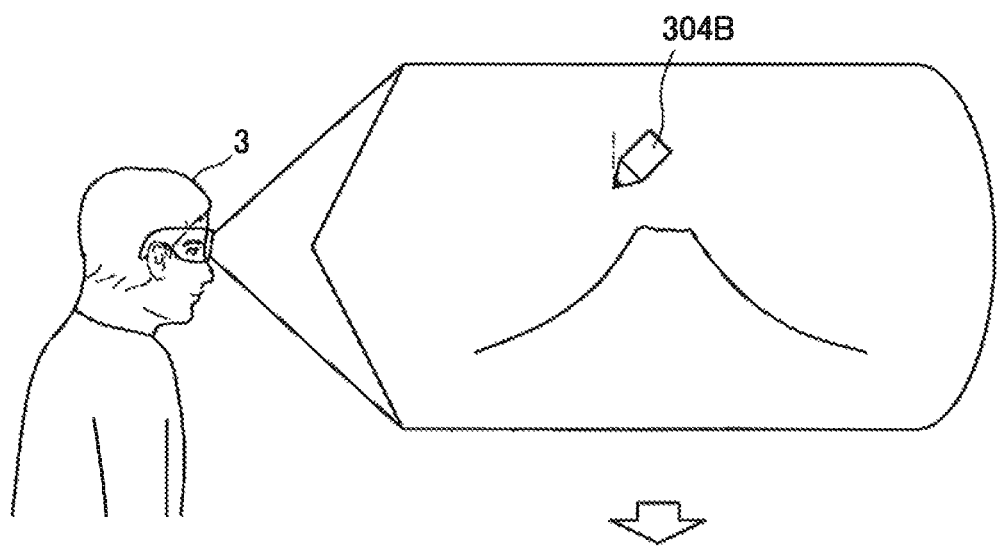
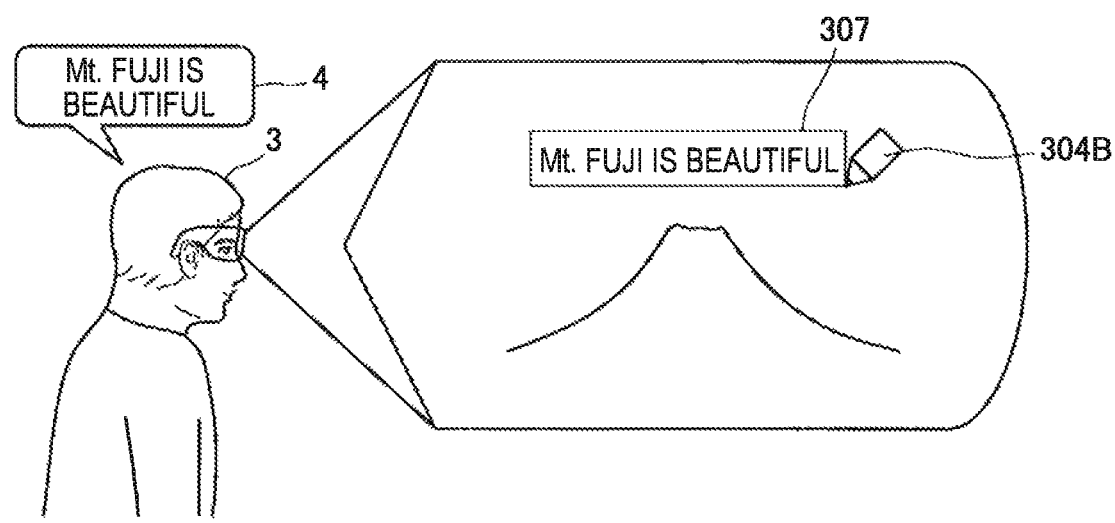

FIG. 27B
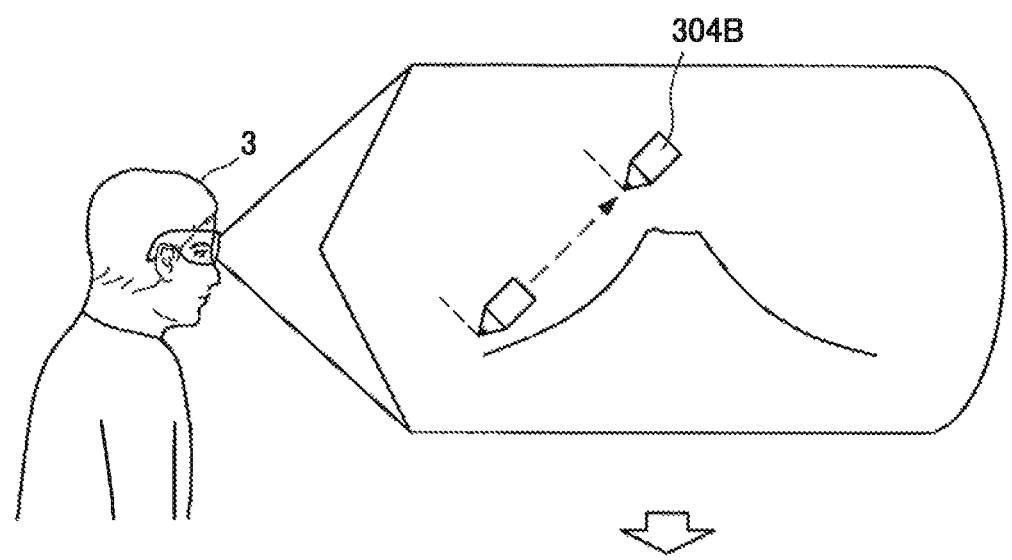
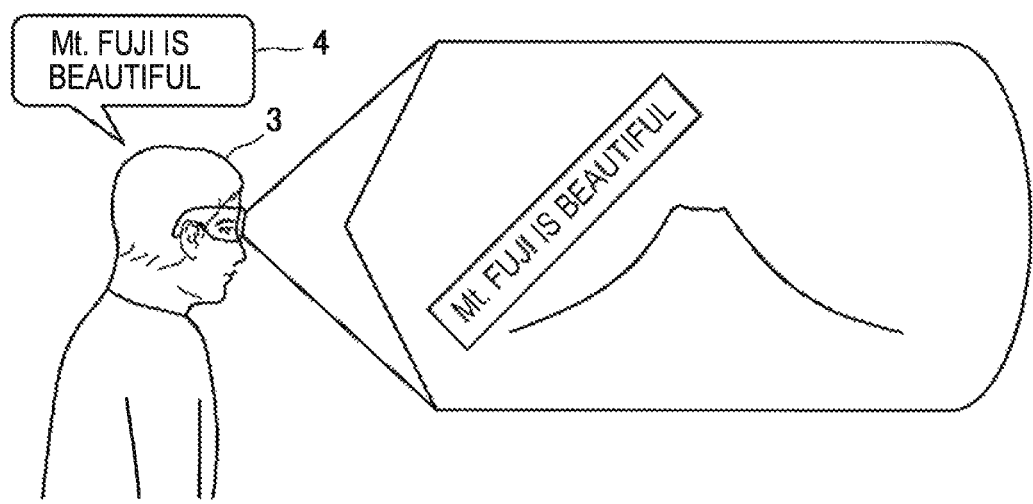

FIG. 30
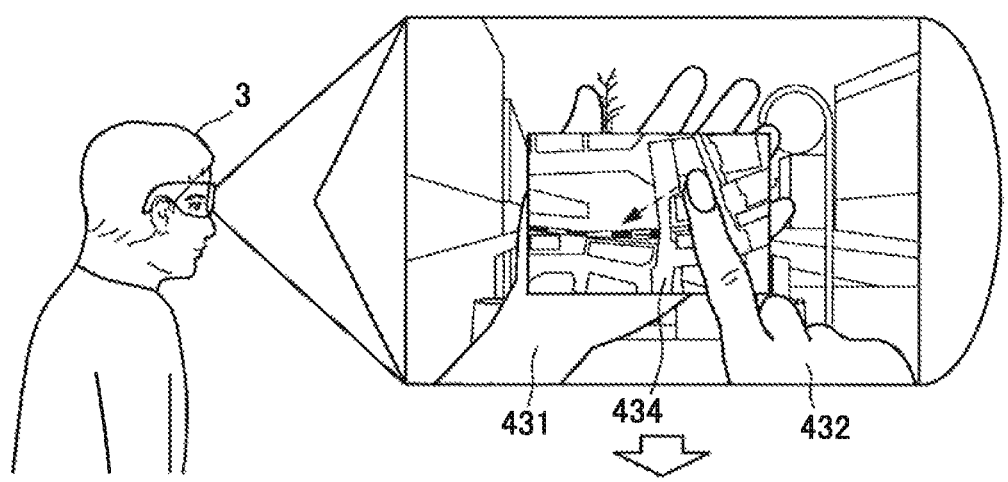
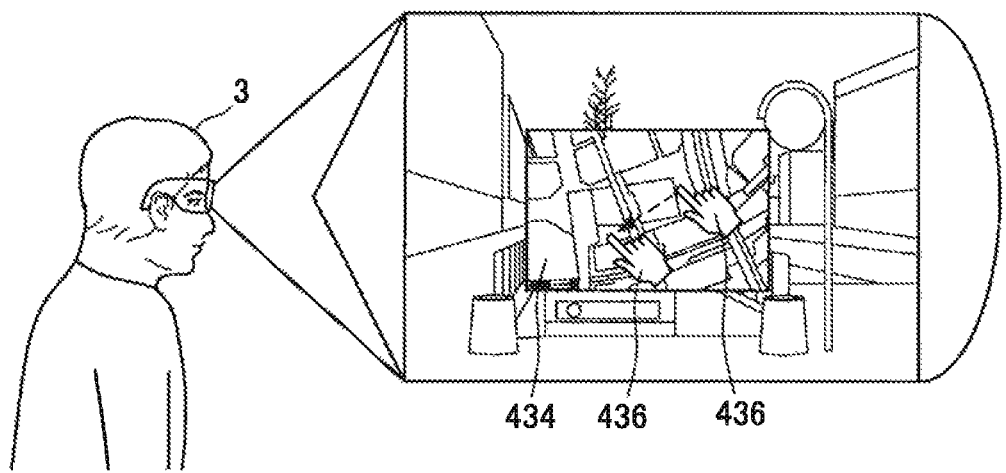

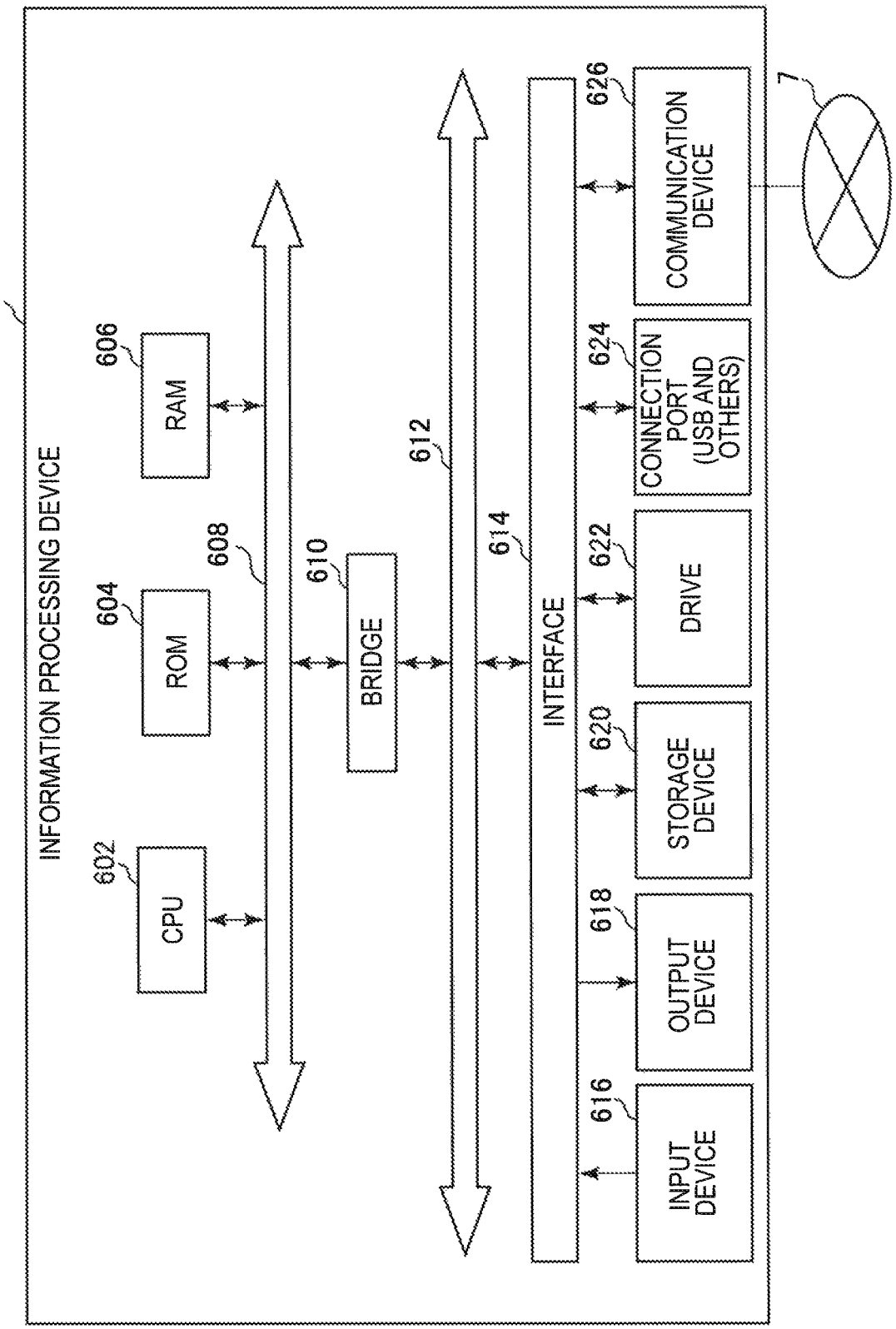

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/051046 (filed on Jan. 14, 2016) under 35 U.S.C. § 371, which claims priority to Japanese Patent Application No. 2015-072407 (filed on Mar. 31, 2015), which are all hereby incorporated by reference in their entirety.

TECHNICAL FIELD

The present disclosure relates to an information processing device, an information processing method, and a program.

BACKGROUND ART

In recent years, eyeglass-type wearable devices have attracted public attention. In eyeglass-type wearable devices, it is common for an object such as content to be operated using a gesture of a hand or the like.

For example, a glasses-type wearable terminal that enables a user to view both a surrounding environment and displayed content is disclosed in Patent Literature 1. Further, a technique of projecting a virtual keyboard on a hand of the user or an object therearound, acquiring an operation of the user typing on the projected virtual keyboard, and acquiring input information from the user is disclosed in Patent Literature 1.

CITATION LIST

Patent Literature

Patent Literature 1: JP 2013-521576T

DISCLOSURE OF INVENTION

Technical Problem

However, in the glasses-type wearable terminal disclosed in Patent Literature 1 or the like, there are cases in which a field of view of the user is restricted by a gesture for an object operation.

For example, when the user performs an object operation, a hand making a gesture falls within the field of view of the user, and thus it is difficult for the user to view a landscape behind the hand. Further, when the user types on the virtual keyboard, keys of the virtual keyboard are hidden by the typing hand, and thus it is difficult for the user to confirm the keys he/she is typing.

In this regard, the present disclosure proposes an information processing device, an information processing method, and a program which are novel and improved and capable of securing the field of view of the user even when the hand of the user falls within the field of view.

Solution to Problem

According to the present disclosure, there is provided an information processing device including: an image acquiring unit configured to acquire a field-of-view image corresponding to a field of view of a user; a hand detecting unit configured to detect a hand of the user from the field-of-view image; a background image generating unit configured to generate a background image of a background which is not visible to the user due to the hand on the basis of the field-of-view image; and an output image generating unit configured to generate a display image in which the background image is superimposed on an area occupied by the hand in the field of view of the user.

In addition, according to the present disclosure, there is provided an information processing method including: acquiring a field-of-view image corresponding to a field of view of a user; detecting a hand of the user from the field-of-view image; generating a background image of a background which is not visible to the user due to the hand on the basis of the field-of-view image; and generating a display image in which the background image is superimposed on an area occupied by the hand in the field of view of the user.

In addition, according to the present disclosure, there is provided a program causing a computer to function as: an image acquiring unit configured to acquire a field-of-view image corresponding to a field of view of a user; a hand detecting unit configured to detect a hand of the user from the field-of-view image; a background image generating unit configured to generate a background image of a background which is not visible to the user due to the hand on the basis of the field-of-view image; and an output image generating unit configured to generate a display image in which the background image is superimposed on an area occupied by the hand in the field of view of the user.

According to the present disclosure, it is possible to display an image of a background which is hidden by the hand making a gesture and therefore not visible to the user by superimposing it on the hand of the user. Therefore, the information processing device according to the present disclosure enables the user to view the field of view as if the hand making the gesture were removed.

Advantageous Effects of Invention

As described above, according to the present disclosure, it is possible to secure the field of view of the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a block diagram illustrating an internal configuration of the information processing device according to the embodiment.

FIG. 3A is an explanatory diagram illustrating a method for generating a background image using parallax of an imaging device.

FIG. 3B is an explanatory diagram illustrating a method for generating a background image using chronological images.

FIG. 23 is an explanatory diagram illustrating a specific example of a disclosure scope level of detailed information.

FIG. 26A is an explanatory diagram illustrating a field of view viewed by the user using the information processing device according to the modified example.

FIG. 27A is an explanatory diagram illustrating a field of view viewed by the user using the information processing device according to the modified example.

FIG. 27B is an explanatory diagram illustrating a field of view viewed by the user using the information processing device according to the modified example.

FIG. 30 is an explanatory diagram illustrating a field of view viewed by the user using the information processing device according to the modified example.

FIG. 32 is a block diagram illustrating an example of a hardware configuration of an information processing device according to one embodiment of the present disclosure.

MODE(S) FOR CARRYING OUT THE INVENTION

Figure 1:
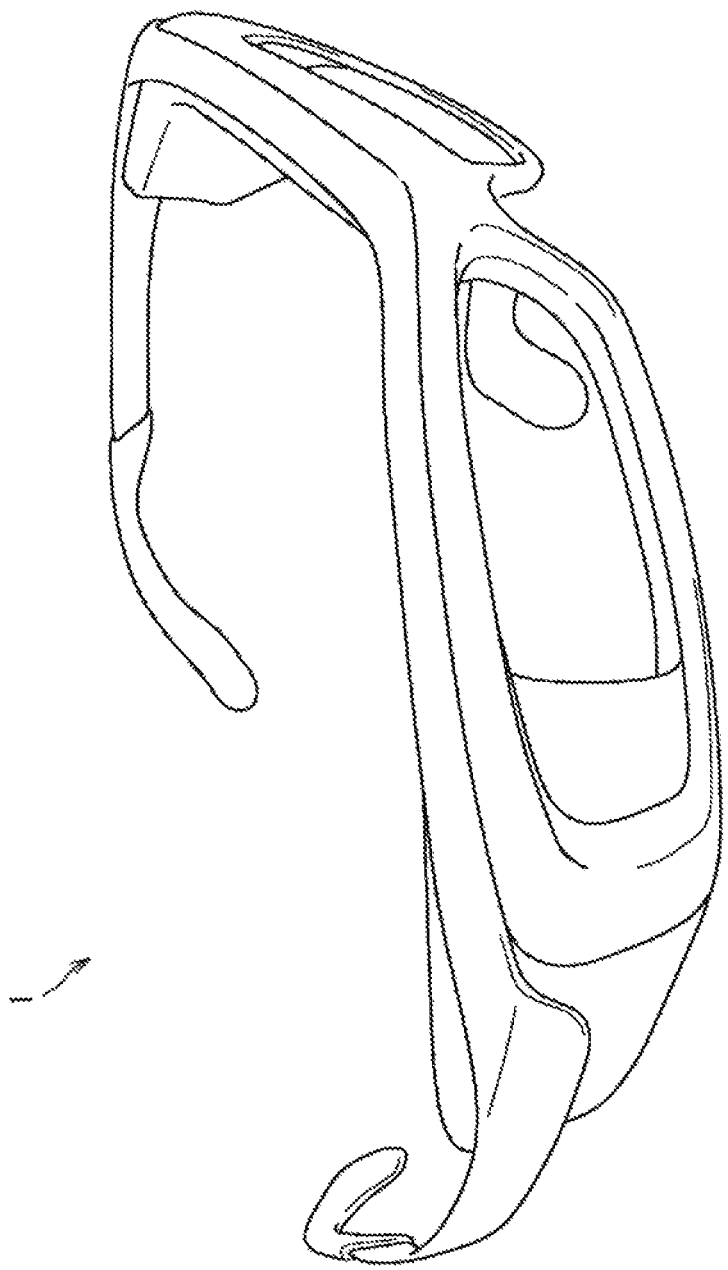
FIG. 1 is a perspective view illustrating an appearance example of an information processing device according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Information processing device according to one embodiment of present disclosure
  1.1. Overview of information processing device
  1.2. Configuration of information processing device
  1.3. Control of information processing device
2. Modified example
  2.1. Configuration of information processing device
  2.2. Control of information processing device
  2.3. Example of field of view viewed by user
3. Hardware configuration
4. Conclusion

1. One Embodiment of Present Disclosure

[1.1. Overview of Information Processing Device]

First, an appearance example of an information processing device 1 according to one embodiment of the present disclosure will be described with reference to FIG. 1. FIG.

1 is a perspective view illustrating an appearance example of the information processing device 1 according to the present embodiment.

As illustrated in FIG. 1, the information processing device 1 according to the present embodiment is, for example, a glasses-type wearable terminal device. The glasses-type wearable terminal device includes, for example, a transmissive display device. Accordingly, the information processing device 1 enables the user to view an image displayed by the wearable terminal device and an image viewed by the visual sense of the user in a superimposed manner.

In order to enable the user to intuitively operate various kinds of objects such as content, the information processing device 1 recognizes a gesture of the user and operates various kinds of objects according to the recognized gesture.

However, in the glasses-type wearable terminal device, since the field of view of the user is narrow; when the user operates an object with a gesture, there are cases in which the field of view of the user is blocked by the hand making the gesture, and the user is unable to see the background behind the hand. Further, since the gesture operation is performed near the user, when the object serving as an operation target is small, there are cases in which the object is hidden by the hand, and it is difficult to operate the object.

The information processing device 1 according to the present embodiment acquires an image corresponding to the field of view of the user through various kinds of sensors (far example, an imaging device and the like), and generate an image of the background that is not visible to the user due to the hand on the basis of the obtained image in the field of view. Further, the information processing device 1 displays the generated image of the background to be superimposed on the hand blocking the background from the user. Accordingly, the information processing device 1 can enable the user to view the image as if the hand making the gesture or the like were removed in the field of view, and thus it is possible to secure the field of view of the user.

The information processing device 1 may not include a display device. When the information processing device 1 does not include a display device, for example, the information processing device 1 outputs the generated display image to an externally connected display device, and the display image is displayed by the external display device.

A configuration of the information processing device 1 according to the present embodiment which has been described in the overview will be described in detail below.

[1.2. Configuration of Information Processing Device]

Next, a configuration example of the information processing device 1 according to the present embodiment will be described with reference to FIGS. 2 to 4. FIG. 2 is a block diagram illustrating an internal configuration of the information processing device 1 according to the present embodiment.

As illustrated in FIG. 2, the information processing device 1 according to the present embodiment includes an image acquiring unit 102, a hand detecting unit 104, a background image generating unit 106, and an output image generating unit 108.

The image acquiring unit 102 acquires a field-of-view image corresponding to the field of view of the user. Specifically, the image acquiring unit 102 acquires an image captured by an imaging device (not illustrated) or the like mounted in the information processing device 1. The image acquired by the image acquiring unit 102 may be an image including an area corresponding to the field of view of the user or may be an image including an area larger than the area corresponding to the field of view of the user.

The hand detecting unit 104 detects the hand of the user from the image acquired by the image acquiring unit 102. Specifically, the hand detecting unit 104 stores a detection parameter indicating the shape of the hand through prior learning, and detects the hand of the user from the image acquired by the image acquiring unit 102 on the basis of the detection parameter. Further, the hand detecting unit 104 outputs a parameter specifying an area occupied by the detected hand of the user. The hand of the user detected by the hand detecting unit 104 is not limited to the hand making the gesture and includes a hand not making the gesture.

For example, the hand detecting unit 104 detects the hand of the user from the image by machine learning using contour information and luminance information as detection parameters on the basis of a plurality of images of hands at various angles which are prepared in advance. A known method can be used as a machine learning algorithm, but an algorithm such as a support vector machine or a neural network can be used.

The background image generating unit 106 generates a background image corresponding to the background that is not visible to the user due to the hand on the basis of the field-of-view image acquired by the image acquiring unit 102. For example, the background image generating unit 106 may generate the background image corresponding to the background that is not visible to the user using a parallax of the imaging device. Further, the background image generating unit 106 may generate the background image corresponding to the background that is not visible to the user using chronological images.

Here, a specific method in which the background image generating unit 106 generates the background image on the basis of the field-of-view image acquired by the image acquiring unit 102 will be described with reference to FIGS. 3A and 3B. FIG. 3A is an explanatory diagram illustrating a method for generating the background image using the parallax of the imaging device. FIG. 3B is an explanatory diagram describing a method for generating the background image using the chronological images.

When the background image is generated using the parallax of the imaging device, for example, as illustrated in FIG. 3A, the image acquiring unit 102 acquires field-of-view images A, B, C and D from a plurality of imaging devices. Specifically, the field-of-view images A, B, C, and D are field-of-view images captured by the imaging devices mounted at different positions of the information processing device 1, and for example, the field-of-view images A, B, C and D are field-of-view images captured by the imaging devices mounted on the upper side, the right side, the lower side, and the left side of the information processing device 1. A field-of-view image E is a field-of-view image indicating the field of view that the user is actually viewing through the information processing device 1.

Since the field-of-view images A, B, C and D are captured by the imaging device mounted in the information processing device 1, the parallax occurs with respect to the field-of-view image E which the user is viewing through the information processing device 1. Further, because the field-of-view images A, B, C, and D are different in the mounting position in the information processing device 1, the parallax occurs.

Specifically, the hand of the user existing near the user is shown at different positions in the field-of-view images A, B, C, D, and E due to the parallax. On the other hand, the change in the background in the field-of-view image away from the user caused by the parallax in the field-of-view images A, B, C, D and E is small. Therefore, it is possible to acquire the background which is not visible due to the hand in the field-of-view image E actually viewed by the user using the field-of-view images A, B, C, and D which differ in the position of the hand due to the parallax.

Therefore, the background image generating unit 106 can generate the image of the background which is not visible due to the hand of the user in the field-of-view image E by performing image processing on a difference between the backgrounds of the field-of-view images A, B, C, and D and the background of the field-of-view image E.

Further, when the background image is generated using the chronological images, for example, as illustrated in FIG. 3B, the image acquiring unit 102 stores acquired chronological field-of-view images F, G, and H in a buffer such as an internal memory. Specifically, the field-of-view image H is a field-of-view image in which the hand of the user falls within the field of view, the field-of-view image G is a field-of-view image at a moment at which the hand of the user falls within the field of view at stage prior to the field-of-view image H, and the field-of-view image F is a field-of-view image before the hand of the user falls within the field of view at a stage prior to the field-of-view image G.

Since the field-of-view images F, G, and H differ in an imaging timing, the hand of the user is shown at different positions in the field-of-view images F, G, and H. Therefore, it is possible to acquire even the background which is not visible to the user due to the hand in the field-of-view image H using the field-of-view images F and G which differ in the position of the hand of the user since the imaging timings are different.

Therefore, the background image generating unit 106 can generate the background which is not visible due to the hand of the user in the field-of-view image H by performing imaging processing on the backgrounds of the field-of-view images F and G at a stage prior to the field-of-view image H.

A method of generating the background image by the background image generating unit 106 is not limited to the above examples. The background image generating unit 106 may generate the background image using other methods or may generate the background image using a combination of the above methods.

The output image generating unit 108 generates the display image to be displayed such that the display image is superimposed on the field of view of the user, for example, in a transmissive display device or the like. Specifically, the output image generating unit 108 generates the display image in which the background image generated by the background image generating unit 106 is superimposed on the hand of the user detected by the hand detecting unit 104. By displaying the display image generated by the output image generating unit 108 to be superimposed on the field of view of the user, it is possible to remove the hand of the user from the field of view of the user.

The output image generating unit 108 will be described in more detail with reference to FIG. 4. FIG. 4 is an explanatory diagram for describing the display image generated by the output image generating unit 108.

Figure 4:
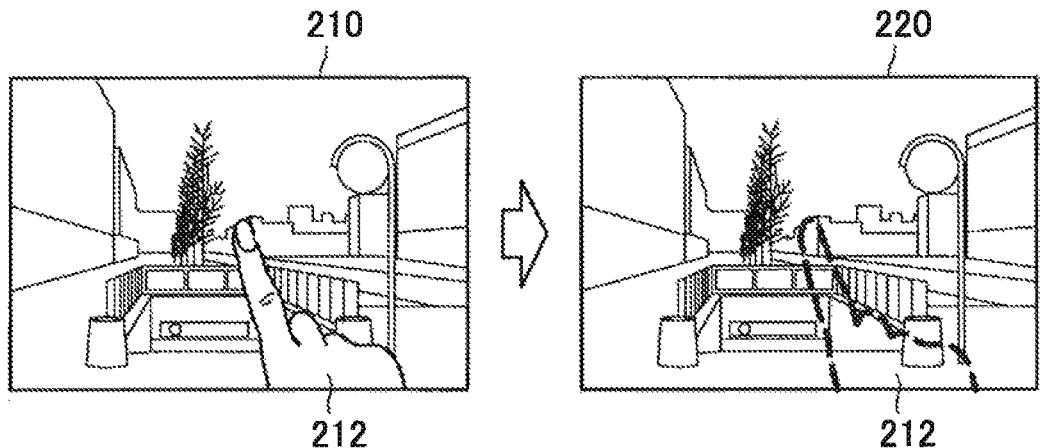
FIG. 4 is an explanatory diagram illustrating a display image generated by an output image generating unit.

As illustrated in FIG. 4, when a hand 212 of the user falls within a field of view 210 of the user, the output image generating unit 108 generates the display image to be displayed such that the background image generated by the background image generating unit 106 is superimposed on the hand 212 of the user. The background image generated by the background image generating unit 106 exists behind the hand 212 of the user and is an image of the background which is not visible to the user. Therefore, the user can view the background which is hidden by the hand and not visible due to the hand 212 in the field of view 210 through a field of view 220 in which the display image is superimposed. In other words, the output image generating unit 108 can enable the user to view the field of view 220 in which the hand 212 of the user falling within the field of view 210 of the user is removed.

According to the above configuration, in the information processing device 1 according to the present embodiment, when the hand of the user falls within the field of view, the background blocked by the hand of the user can be superimposed on the hand of the user and displayed. Accordingly, the user can view the background hidden by the hand falling within the field of view through the display image generated by the information processing device 1. Thus, the information processing device 1 according to the present embodiment can secure the field of view of the user by preventing the field of view of the user from being restricted by the hand falling within the field of view.

[1.3. Control of Information Processing Device]

Figure 5:
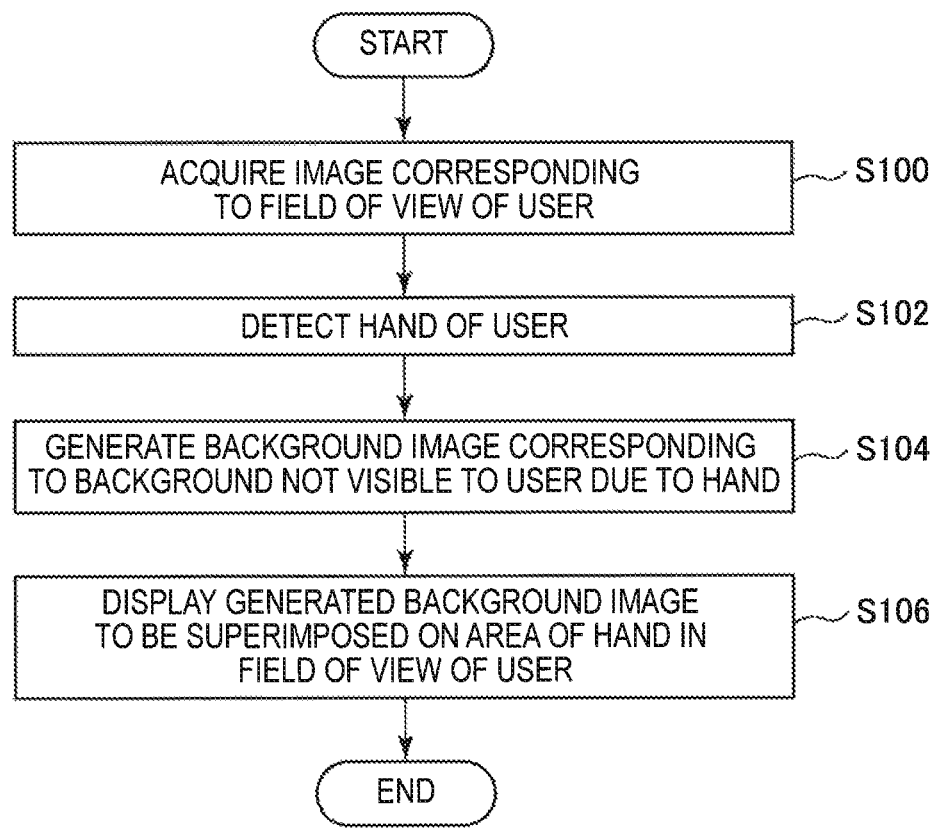
FIG. 5 is a flowchart illustrating a control example executed by the information processing device according to the embodiment.

Next, a control example of the information processing device 1 according to the present embodiment will be described with reference to FIG. 5. FIG. 5 is a flowchart illustrating a control example executed by the information processing device 1 according to the present embodiment.

As illustrated in FIG. 5, first, the image acquiring unit 102 acquires the field-of-view image corresponding to the field of view of the user (S100). Then, the hand detecting unit 104 detects the hand of the user from the field-of-view image acquired by the image acquiring unit 102 (S102). Then, the background image generating unit 106 acquires the background image corresponding to the background which is hidden by the hand falling within the field of view and not visible to the user (S104). Further, the output image generating unit 108 generates the display image to be displayed such that the background image is superimposed on the hand in the field of view (S106).

Through the above control, the generated display image is superimposed and displayed in the field of view of the user, and thus the information processing device 1 according to the present embodiment can enable the user to view the field of view in which the hand of the user falling within the field of view is removed. Accordingly, the information processing device 1 according to the present embodiment can secure the field of view of the user.

2. Modified Example

[2.1. Configuration of Information Processing Device]

Figure 6:
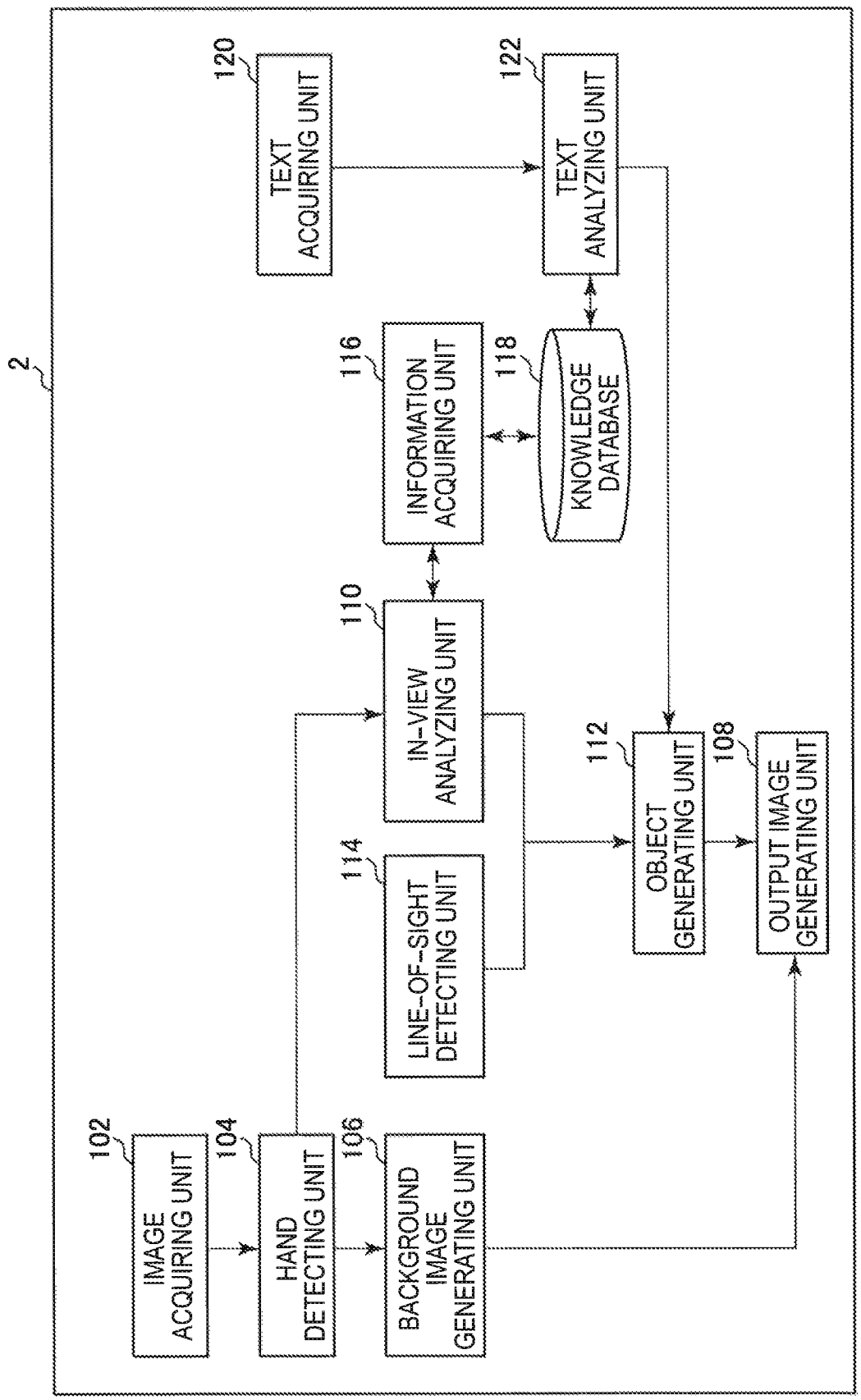
FIG. 6 is a block diagram illustrating an internal configuration of an information processing device according to a modified example of one embodiment of the present disclosure.

Next, an information processing device 2 according to a modified example of one embodiment of the present disclosure will be described with reference to FIGS. 6 to 31B. FIG. 6 is a block diagram illustrating an internal configuration of the information processing device 2 according to the present modified example.

As illustrated in FIG. 6, the information processing device 2 according to the present modified example includes an image acquiring unit 102, a hand detecting unit 104, a background image generating unit 106, and an output image generating unit 108, and further includes an in-view analyzing unit 110, an object generating unit 112, a line-of-sight detecting unit 114, an information acquiring unit 116, a knowledge database 118, a text acquiring unit 120, and a text analyzing unit 122.

The image acquiring unit 102, the hand detecting unit 104, the background image generating unit 106, and the output image generating unit 108 have substantially the same configurations as those described above in <1. One embodiment of present disclosure>, and thus detailed description thereof will be omitted.

The in-view analyzing unit 110 analyzes an object which is instructed to be operated by the gesture made by the hand of the user falling within the field of view. Specifically, the in-view analyzing unit 110 analyzes a direction and a distance in which the hand of the user detected by the hand detecting unit 104 moves chronologically, and specifies the gesture made by the user.

Further, the in-view analyzing unit 110 specifies a point indicated by the user from the shape of the hand of the user, and specifies a target indicated by the user. For example, the in-view analyzing unit 110 may specify the tip of the index finger as the point indicated by the user when the shape of the hand of the user is a shape in which only the index finger is extended, and other fingers are bent. Further, the in-view analyzing unit 110 specifies an operation which the user performs on the object from the gesture of the user. Examples of the operation on the object include a tap operation, a drag operation, a flick operation, a pinch-in/-out operation, and the like, and it is desirable that the information processing device 2 decides a correspondence relation between the gestures and the operations in advance. A specific method of specifying the target indicated by the user by the in-view analyzing unit 110 will be described later.

The object generating unit 112 generates various kinds of objects to be displayed to be superimposed on the field of view of the user. Specifically, the object generating unit 112 generates a pointer object indicating the point indicated by the gesture of the user in accordance with the gesture made by the user. Further, the object generating unit 112 generates an object displaying content such as a map, a moving image, or various kinds of information.

Accordingly, the user can confirm the point indicated by the gesture with the pointer object even when the hand of the user making the gesture is removed from the field of view. Further, since the pointer object generated by the object generating unit 112 is commonly smaller than the hand of the user making the gesture, the user can view the operation target which is hidden by the hand making the gesture. Therefore, the object generating unit 112 can improve the operability on the target or the object within the field of view.

The hand of the user indicating the point in the field of view is not stationary and is likely to shake finely. For this reason, the object generating unit 112 may track and move the pointer object only when the change of the point indicated by the user is a threshold value or more and may not move the pointer object when the change of the point indicated by the user is less than the threshold value. In this case, the object generating unit 112 can absorb the fine shaking of the hand of the user and move the pointer object only when the user intentionally moves the hand, and thus the operational feeling of the user can be improved.

Further, the object generating unit 112 may change the image of the pointer object for each function to be executed. In this case, the object generating unit 112 can indicate a function to be executed by the gesture to the user through the image of the generated pointer object.

Further, the object generating unit 112 may control whether or not the pointer object is generated on the basis of a distance between the point indicated by the user in the field of view and a line-of-sight position of the user. Specifically, the object generating unit 112 may generate the pointer object only when the point indicated by the user through the gesture is close to the line-of-sight position of the user. Further, the object generating unit 112 may change the transparency of the pointer object in accordance with the distance between the point indicated by the user through the gesture and the line-of-sight position of the user. Specific control of the pointer object based on the line-of-sight position of the user will be described later in description of the line-of-sight detecting unit 114.

Figure 7:
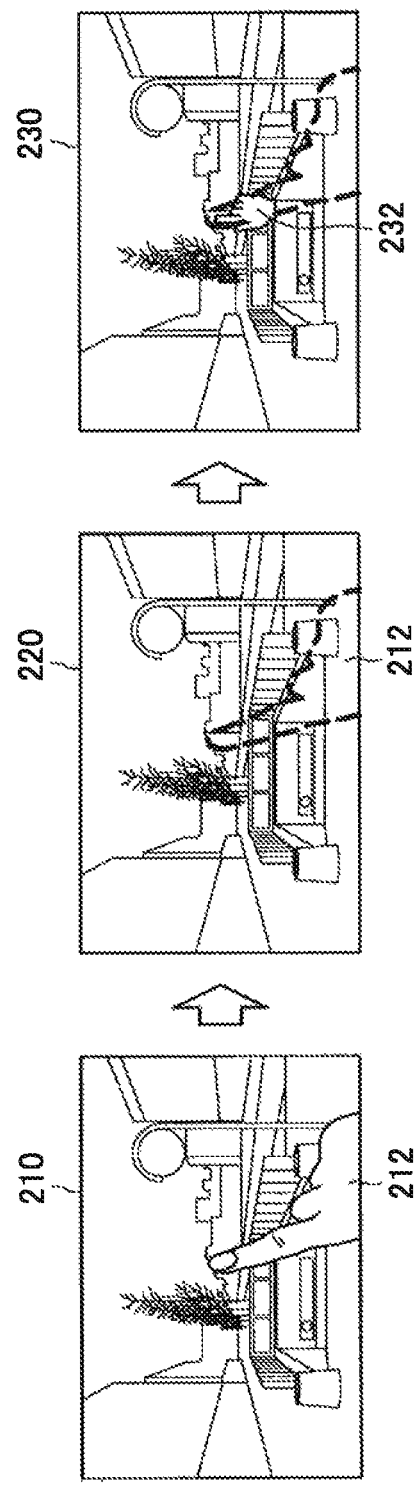
FIG. 7 is an explanatory diagram illustrating an example of a display image generated by an output image generating unit in the modified example.
Figures 8, 9:
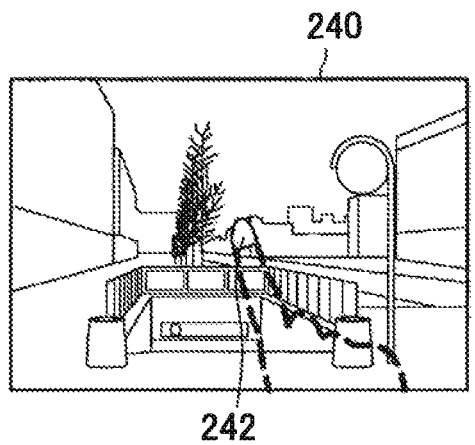
FIG. 8 is an explanatory diagram for describing a display image when a part of a hand of the user is used as a pointer object.
FIG. 9 is an explanatory diagram illustrating an example of a pointer object when an object generating unit generates a pointer object in accordance with each function.

Here, the pointer object generated by the object generating unit 112 will be described in further detail with reference to FIGS. 7 to 9. FIG. 7 is an explanatory diagram illustrating an example of the display image generated by the output image generating unit 108 in the present modified example. FIG. 8 is an explanatory diagram for describing the display image when a part of the hand of the user is used as a pointer object and FIG. 9 is an explanatory diagram illustrating an example of the pointer object when the object generating unit 112 generates the pointer object according to each function.

As illustrated in FIG. 7, when the hand 212 of the user falls within the field of view 210 of the user, the output image generating unit 108 generates the display image in which the background image is superimposed on the hand 212 of the user, and enables the user to view the field of view 220 in which the hand 212 is removed. Further, when the object generating unit 112 generates a pointer object 232 indicating the point indicated by the user, the output image generating unit 108 generates a display image including the pointer object 232 and causes the pointer object to be displayed in a field of view 230 of the user. Accordingly, the user can confirm the point indicated by the hand 212 in the field of view 230 through the pointer object 232.

Further, as illustrated in FIG. 8, the pointer object may be a part of the hand of the user (that is, the tip of the finger or the like). Specifically, the output image generating unit 108 may cause the background image to be superimposed on the hand 212 of the user other than a fingertip 242 of the user and generate a display image for displaying the fingertip 242 of the user. More specifically, when the shape of the hand of the user is a shape in which only the index finger is extended, and other fingers are bent, the output image generating unit 108 may generate the display image to be displayed such that only the tip of the index finger is left, and the background image is superimposed on an area other than the tip of the index finger.

Instead of the above method, the object generating unit 112 may generate the pointer object using the image of a part of the hand of the user (that is, the tip of the finger or the like) and use the part of the hand of the user as the pointer object.

According to this configuration, since the pointer object indicating the point indicated by the gesture is displayed at its own fingertip or the like, a feeling that the user is operating can be increased. Accordingly, the information processing device 2 can improve the operational feeling of the user.

Further, as described above, the object generating unit 112 may generate a pointer object having a different image for each function to be performed when the user makes the gesture. For example, the object generating unit 112 may generate the pointer objects illustrated in FIG. 9 for each function.

For example, as illustrated in FIG. 9, the object generating unit 112 may generate a pointer object having an arrow shape for movement of the pointer object. Further, the object generating unit 112 may generate a pointer object having a hand shape for the selection of the target by the pointer object. Further, the object generating unit 112 may generate a pointer object having a pencil shape for a character input to the point indicated by the pointer object. Further, the object generating unit 112 may generate a pointer object having a scissor shape for range selection by the pointer object. Further, the object generating unit 112 may generate a pointer object having a magnifier shape with a question mark for information acquisition related to the target indicated by the pointer object. Furthermore, the object generating unit 112 may generate pointer object having a magnifier shape with a negative or positive sign for enlargement or reduction by the pointer object.

Further, when the target indicated by the pointer object is a target in which any one function is executable (for example, it is a selectable target or a target in which text can be written), the object generating unit 112 may automatically change the image of the pointer object to an image indicating a corresponding function.

Further, in the information processing device 2 according to the present modified example, the output image generating unit 108 may similarly generate the display image in which the background image is superimposed on each hand even when a plurality of hands of the user falls within the field of view.

Figure 10:
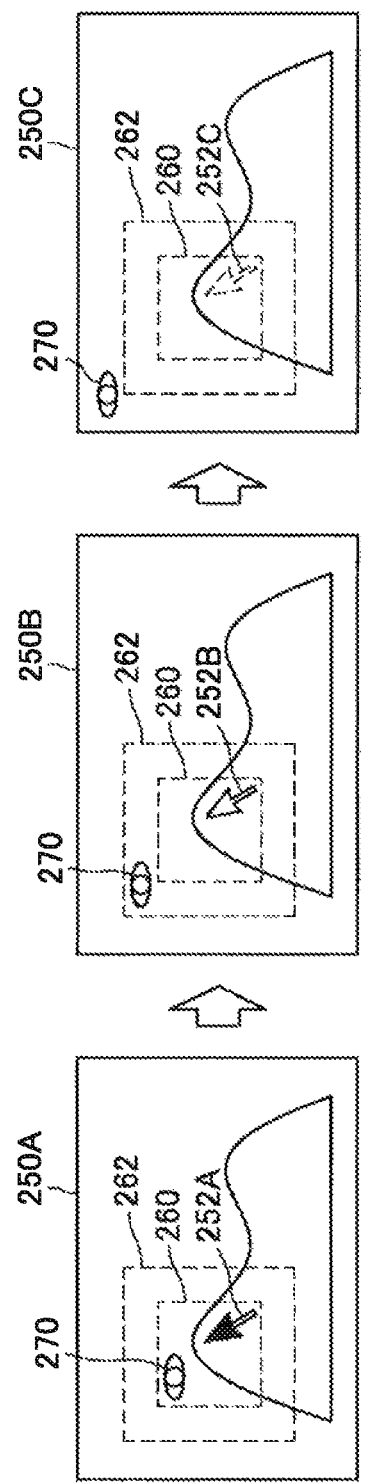
FIG. 10 is an explanatory diagram illustrating a display image generated when a plurality of hands of the user fall within a field of view.

This configuration will be described more specifically with reference to FIGS. 10 and 11. FIG. 10 is an explanatory diagram illustrating a display image generated when a plurality of hands of the user fall within the field of view. Further, FIG. 11 is an explanatory diagram illustrating a display image in which a content object is superimposed on a hand making no gesture.

As illustrated in FIG. 10, when a plurality of hands 412 and 414 of the user fall within a field of view 410, the output image generating unit 108 generates the display image in which the background image generated by the background image generating unit 106 is superimposed on each of the hands 412 and 414 of the user. As described above, the background image generated by the background image generating unit 106 exists behind each of the hands 412 and 414 of the user, and is an image of the background which is not visible to the user by the hands 412 and 414. Accordingly, the user can view the background which is not visible due to the hands 412 and 414 in the field of view 410 in the field of view 420 in which the display image is superimposed.

Figure 11:
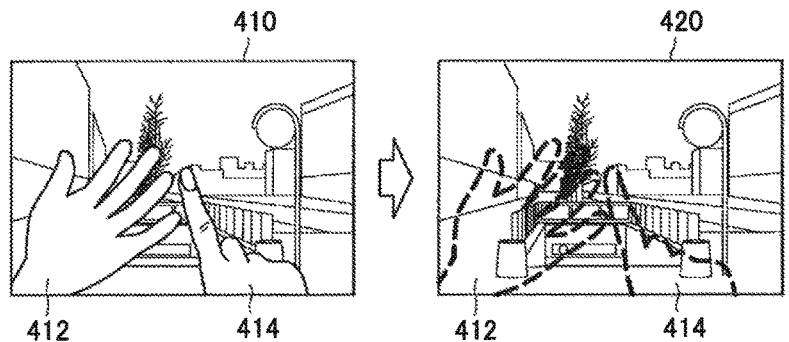
FIG. 11 is an explanatory diagram illustrating a display image in which a content object is superimposed on a hand not making a gesture.

Further, as illustrated in FIG. 11, when one hand 414 making a gesture and the other hand 412 making no gesture fall within in a field of view 410A, the output image generating unit 108 may generate a display image in which a content object 430 is superimposed on the other hand 412. In other words, in a field of view 420A viewed by the user, the hands 412 and 414 of the user falling within the field of view 410A are removed, a pointer object 436 is displayed instead of one hand 414, and the content object 430 is displayed instead of the other hand 412.

According to this configuration, since the content object 430 is superimposed on the other hand 412 making no gesture and displayed, the user can more intuitively operate the display position of the content object 430 and the presence or absence of display. It is desirable that the user is able to arbitrarily select and set the content object 430 displayed to be superimposed on the other hand 412.

Further, in the content object 430 displayed to be superimposed on the other hand 412, the display position thereof in the field of view may be fixed by a gesture such as pinning of the user. In this case, it is unnecessary to cause the other hand 412 to continuously fall within the field of view of the user in order to view the content object 430, and thus the operability of the user is improved.

Here, referring back to FIG. 6, the description of the respective components of the information processing device 2 according to the present modified example will be continued.

The line-of-sight detecting unit 114 detects the line-of-sight position of the user. For example, the line-of-sight detecting unit 114 detects a direction of the line of sight of the user from an image of an eye of the user and detects a position in the field of view at which the user is gazing. In the above example, the position in the field of view at which the user is gazing at is indicated by the line-of-sight position of the user. A known technique can be used as a method in which the line-of-sight detecting unit 114 detects the line-of-sight position of the user, but for example, it is possible to detect the line-of-sight direction and the line-of-sight position of the user, for example, by detecting a corneal reflection image of the eye (a Purkinje image and the center of gravity of the pupil from the image of the eye of the user.

Figure 12:
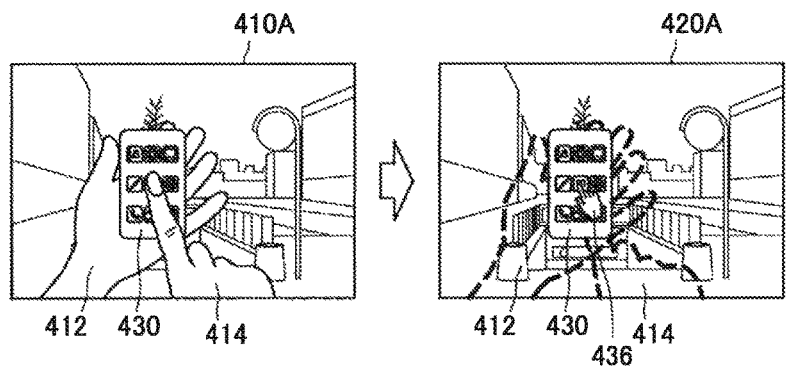
FIG. 12 is an explanatory diagram for describing control of an image of a pointer object based on a distance between a line-of-sight position of the user and a point indicated by a hand of the user.

Here, specific control of the image of the pointer object based on the line-of-sight position of the user will be described with reference to FIG. 12. FIG. 12 is an explanatory diagram for describing control of the image of the pointer object on the basis of the distance between the line-of-sight position of the user and the point indicated by the hand of the user.

As illustrated in FIG. 12, a first area 260 is set around the point designated by the hand of the user (pointer objects 252A, 252B, and 252C), and a second area 262 is set around the outside of the first area. In FIG. 10, the shapes of the first area 260 and the second area 262 are quadrangular, but the present disclosure is not limited to this example. For example, the shapes and the sizes of the first area 260 and the second area 262 can be arbitrarily set, and may be, for example, a circular shape, an elliptical shape, or a polygonal shape. Further, the shapes of the first area 260 and the second area 262 may be freely set by the user.

First, when a line-of-sight position 270 of the user is inside the first area 260 as in a display image 250A, the object generating unit 112 generates the pointer object 252A. This is because when the line-of-sight position 270 of the user is close to the point pointed to by the hand of the user (the pointer object 252A), attention is likely to be drawn to the point indicated by the user. Therefore, in this case, the object generating unit 112 can cause the user to view his/her gesture through the pointer object 252A by generating the pointer object 252A.

Further, when the line-of-sight position 270 of the user is inside the second area 262 and outside the first area 260 as in a display image 250B, the object generating unit 112 may change the transparency of the pointer object 252B. Specifically, the object generating unit 112 may increase the transparency of the pointer object 252B as the distance between the line-of-sight position 270 of the user and the point indicated by the hand of the user (the pointer object 252B) increases. In other words, the object generating unit 112 decreases the transparency of the pointer object 252B as the distance between the line-of-sight position and the point indicated by the hand of the user (the pointer object 252B) decreases. In this case, the object generating unit 112 can inform the user of the position of the pointer object 252B by changing the transparency.

Furthermore, when the line-of-sight position 270 of the user is outside the second area 262 as in a display image 250C, the object generating unit 112 may not generate the pointer object 252C so that the pointer object 252A is not displayed in the display image. This is because when the line-of-sight position 270 of the user is far from the point indicated by the hand of the user (the pointer object 252C), attention is unlikely to be drawn to the point indicated by the user. Therefore, in this case, since the pointer object 252C is not generated, the object generating unit 112 can reduce the power consumption.

Here, referring back to FIG. 6, the description of the respective components of the information processing device 2 according to the present modified example will be continued.

The information acquiring unit 116 acquires information related to the target specified by the in-view analyzing unit 110 from the knowledge database 118. Further, the knowledge database 118 is a database that stores various kinds of information such as information related to general knowledge and information related to the user within a graphical structure.

In the information processing device 2 according to the present modified example, the information acquiring unit 116 acquires various kinds of information related to the target specified on the basis of the gesture of the user from the knowledge database 118. Further, various kinds of information acquired by the information acquiring unit 116 is generated as an information object by the object generating unit 112 and displayed in the display image. Accordingly, the user can conveniently acquire detailed information related to the target indicated by gesture and view it.

Next, a method in which the in-view analyzing unit 110 specifies the target indicated by the user on the basis of the gesture of the user in the information processing device 2 according to the present modified example will be described with reference to FIGS. 13 to 16B. Further, a method in which the information acquiring unit 116 acquires information from the knowledge database 118 and a specific example of the display image generated by the output image generating unit 108 will be described with reference to FIGS. 17 to 22.

Figure 13:
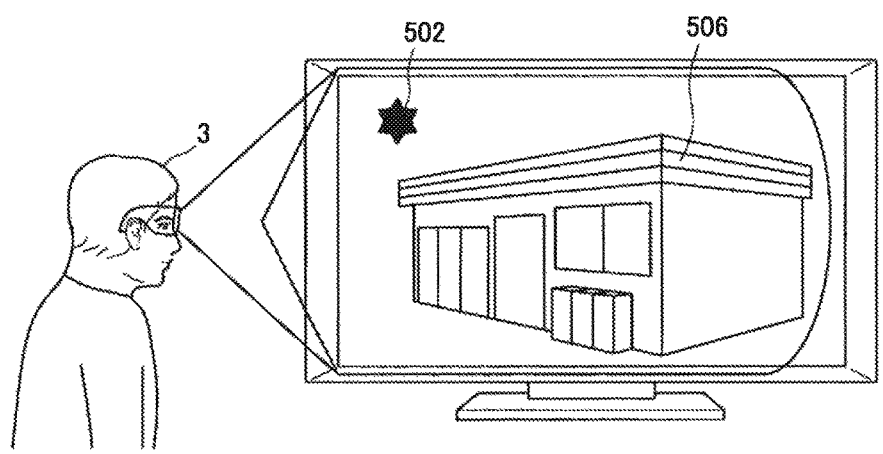
FIG. 13 is an explanatory diagram for describing a first method in which an in-view analyzing unit specifies a target on the basis of a gesture of the user.
Figure 14:
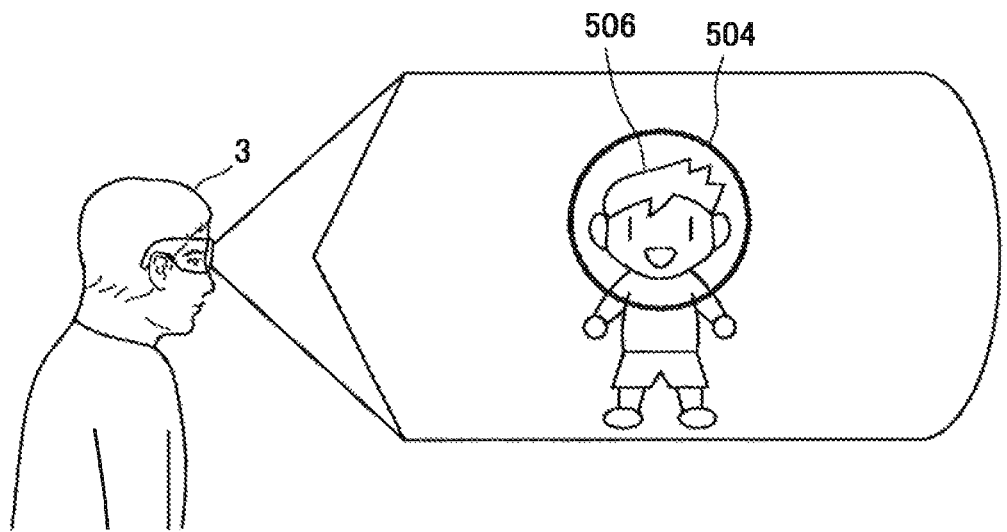
FIG. 14 is an explanatory diagram for describing a second method in which an in-view analyzing unit specifies a target on the basis of a gesture of the user.
Figure 15:
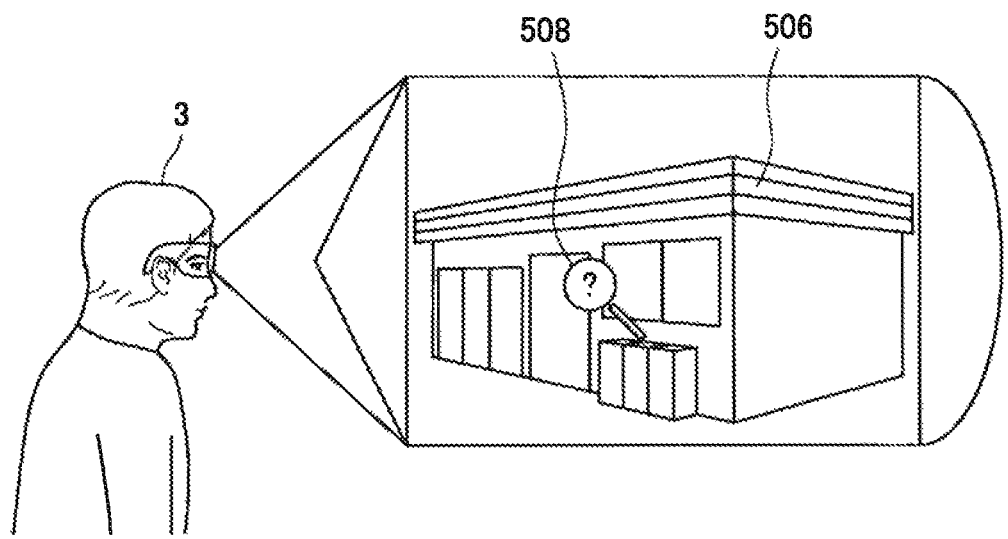
FIG. 15 is an explanatory diagram for describing a third method in which an in-view analyzing unit specifies a target on the basis of a gesture of the user.

First, first to third methods in which the in-view analyzing unit 110 specifies the target on the basis of the gesture of a user 3 will be described with reference to FIGS. 13 to 16B. FIG. 13 is an explanatory diagram for describing the first method in which the in-view analyzing unit 110 specifies the target on the basis of the gesture of the user 3, and FIG. 14 is an explanatory diagram for describing the second method in which the in-view analyzing unit 110 specifies the target on the basis of the gesture of the user 3. FIGS. 15 to 16B are explanatory diagrams for describing the third method in which the in-view analyzing unit 110 specifies the target on the basis of the gesture of the user 3.

As illustrated in FIG. 13, the first method is a method of specifying the target indicated by the user 3 through a tag 502 included in the field of view of the user 3. For example, the tag 502 corresponding to a target 506 is also displayed in a video or the like, and when the user 3 selects the displayed tag 502 through the gesture, the in-view analyzing unit 110 may specify the target 506 corresponding to the selected tag 502 as the target indicated by the user 3. Examples of the tag 502 include a QR code (a registered trademark), a bar code, and an identification ID.

Further, as illustrated in FIG. 14, the second method is a method of specifying the target indicated by the user 3 by identifying the target 506 included in a selection range 504 from a feature quantity of an image or the like. In this case, it is desirable that the in-view analyzing unit 110 store, for example, feature quantities of images such as various articles, persons, and landmarks in advance through machine learning so that the target 506 included in the selection range 504 instructed by the user 3 can be identified.

Figure 16A:
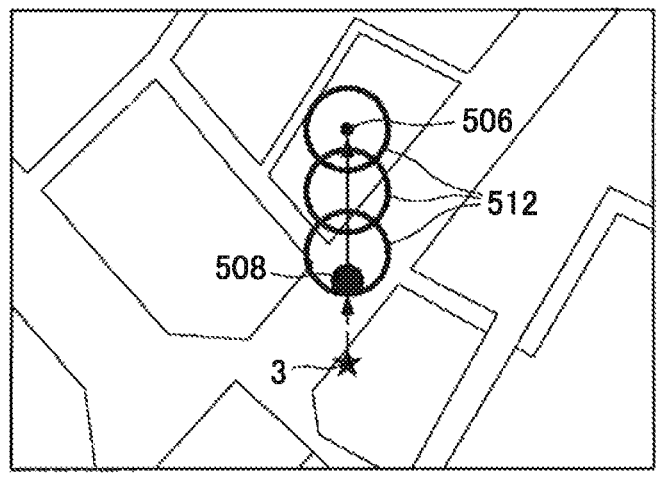
FIG. 16A is an explanatory diagram for describing a third method in which an in-view analyzing unit specifies a target on the basis of a gesture of the user.
Figure 16B:
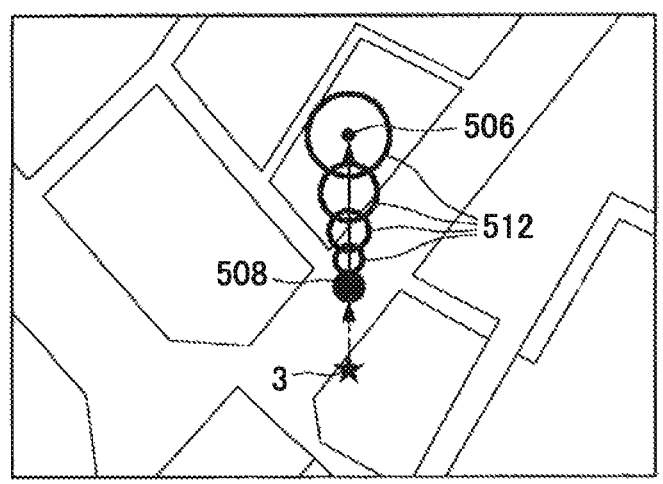
FIG. 16B is an explanatory diagram for describing a third method in which an in-view analyzing unit specifies a target on the basis of a gesture of the user.

Further, as illustrated in FIGS. 15 and 16A, the third method is a method of calculating position information of the target 506 from direction information indicated by the gesture by the user 3 and position information of the user 3 and specifying the target indicated by the user 3.

Specifically, as illustrated in FIG. 15, the in-view analyzing unit 110 first acquires direction (that is, direction indicated by the gesture) information in which a pointer object 508 operated by the user 3 is positioned in the field of view. Then, the in-view analyzing unit 110 acquires the position information of the user 3. The position information of the user 3 can be acquired by a known method, but for example, the position information of the user 3 can be acquired through position measurement using a global navigation satellite system (GNSS) sensor or position measurement using information from a Wi-Fi (a registered trademark) access point, a base station, or the like.

Then, as illustrated in FIG. 16A, by mapping the position of the user 3 and the direction in which the pointer object 508 is positioned onto a map, the in-view analyzing unit 110 can specify that the target 506 indicated by the user 3 exists in a predetermined direction using the user 3 as a start point. Further, the in-view analyzing unit 110 sets a search range 512 in the direction in which the pointer object 508 is positioned using the position of the user 3 as a start point and searches for a target that may be the target 506 indicated by the user 3 within the search range 512. Accordingly, the in-view analyzing unit 110 can specify the target indicated by the user 3.

Here, as illustrated in FIG. 16A, the search range 512 may be set as a circle having a predetermined search radius from the indicated direction vector oriented in the direction in which the pointer object 508 is positioned using the user 3 as the start point. The search radius can be arbitrarily set, but, for example, it can be set by the following method.

For example, when a position error of the gesture operation is ±0.1 m, and an ideal distance between the position of the gesture operation and the information processing device 2 is 0.3 m, a maximum error angle between the indicated direction vector and the target 506 is 18.4°. Therefore, in order to set the search range so that the maximum error angle of 18.4° covered, the search radius can be set to 10 m when the distance between the information processing device 2 and the search range center is 30 m.

Further, an area in which the search range 512 is set may be limited to, for example, an area of up to 50 meters from the user 3. This is because the target away from the user 3 appears to be small for the user and is less likely to be viewed by the user 3, and the user 3 is less likely to indicate it.

Further, as illustrated in FIG. 16B, the search range 512 may be increased as the distance from the user 3 increases. This is because since the target 506 away from the user 3 appears to be small for the user, the user 3 is considered to be less unlikely to indicate the target 506 accurately through the gesture. For example, in FIG. 16B, the search range 512 is a fan-like area oriented in the direction in which the pointer object 508 is positioned using the user 3 as the start point. According to this configuration, the in-view analyzing unit 110 can more reliably set the search range 512 including the target 506 indicated by the user 3. A size change rate when the search range 512 is far from the user 3 can be arbitrarily set, but for example, it may increase linearly or may increase exponentially.

Here, when there are a plurality of targets that can be the target 506 indicated by the user 3 in the search range 512, the in-view analyzing unit 110 may specify a target which is smallest in the distance to the indicated direction vector oriented in the direction in which the pointer object 508 is positioned using the user 3 as the start point as the target 506 indicated by the user 3. Further, the in-view analyzing unit 110 may list all targets that can be the target 506 indicated by the user 3 and cause the user 3 to select the target 506 to be indicated from the list.

Further, when the position information of the user 3 and the direction information in which the pointer object 508 is positioned are high in accuracy, it is desirable to select a target with the smallest distance to the indicated direction vector using the user 3 as the start point as the target 506 designated by the user 3. Further, when the position information of the user 3 and the direction information in which the pointer object 508 is positioned are low in accuracy, it is desirable to list all targets which can be the target 506 indicated by the user 3 and cause the user 3 to select the target 506 to be indicated from the list.

Further, when the line-of-sight position of the user 3 is detected by the line-of-sight detecting unit 114, the in-view analyzing unit 110 can acquires information related to the line-of-sight direction of the user 3. Therefore, by combining the information related to the direction in which the pointer object 508 is positioned and the information related to the line-of-sight direction of the user 3, the in-view analyzing unit 110 can improve the accuracy of the direction in which the search range 512 is set. Further, when the line-of-sight direction of the user 3 and the direction in which the pointer object 508 is positioned are significantly different, the information processing device 2 gives a feedback to the user 3 so that the user 2 looks at in the direction of the target 506 to be indicated.

Next, a method of acquiring the information related to the target specified by the information acquiring unit 116 from the knowledge database 118 and a specific example in which the acquired information is added to the specified target will be described with reference to FIGS. 17 to 22.

Figure 17:
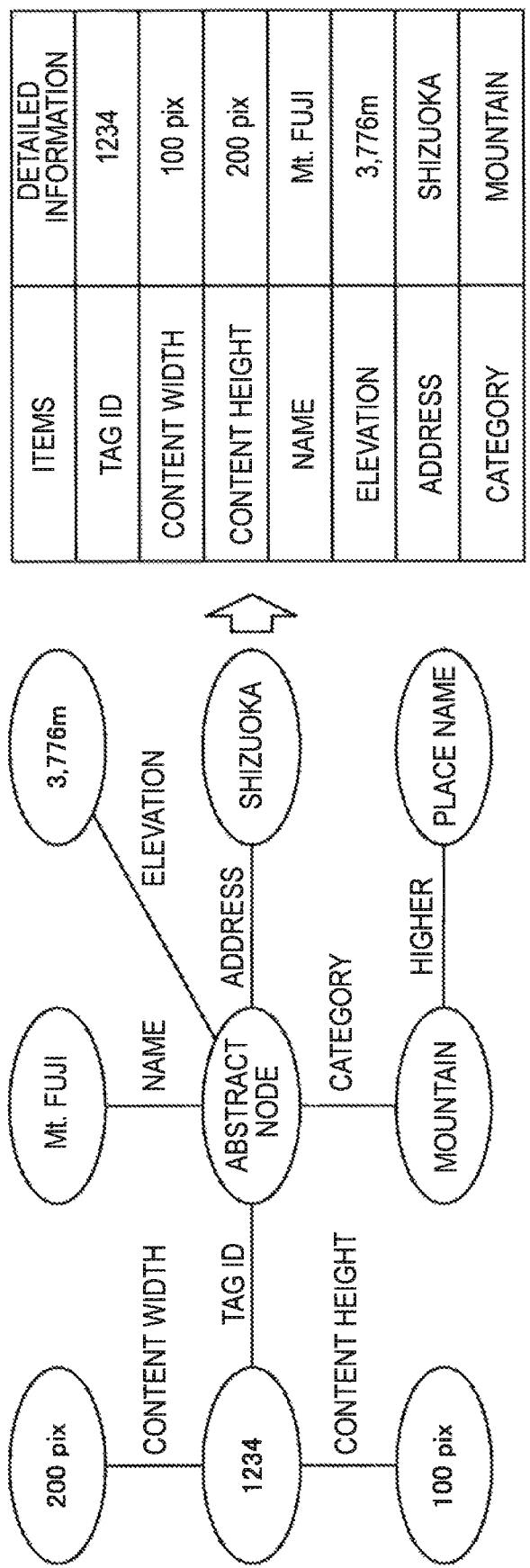
FIG. 17 is an explanatory diagram illustrating a part of a graphical structure of information for a "target" having the "name" "Mt. Fuji."
Figure 18:
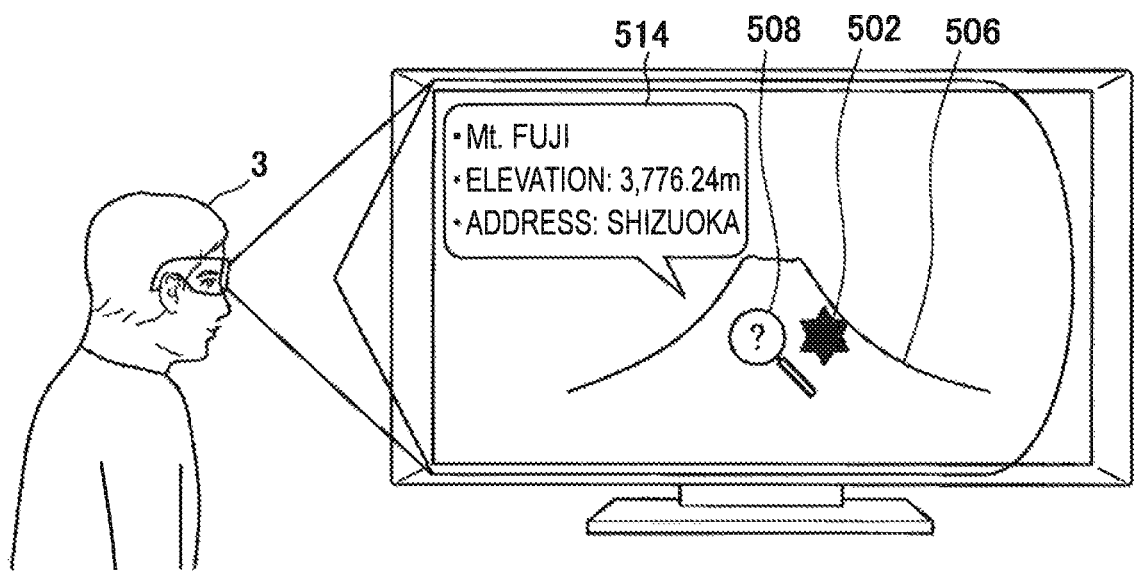
FIG. 18 is an explanatory diagram for describing a display image in which information is added to a "target" having the "name" "Mt. Fuji."

First, a specific example of adding information to a target with a tag will be described with reference to FIGS. 17 and 18. FIG. 17 is an explanatory diagram illustrating a part of a graphical structure of information for a "target" having the "name" "Mt. Fuji," and FIG. 18 is an explanatory diagram for describing a display image in which information is added to the target having the "name" "Mt. Fuji."

Here, the graphical structure is one in which relevance between pieces of information is indicated as a relation using each piece of information as a node. A basic structure of the graphical structure is a triple of "subject-predicate-object," and at this time, the node is "subject, object," and the relation is "predicate."

As illustrated in FIG. 17, for example, in the triple of "Mt. Fuji-elevation-3,776 m," the node is "Mt. Fuji, 3,776 m," and the relation is "elevation." It is possible to generate a graphical structure in which information is connected to a tree diagram by connecting such triples. In such a graphical structure, there is a central node in which a large number of nodes hang, and such a node is defined as an abstract node. In FIG. 17, nodes having relations such as "name," "elevation," "address," "category," or the like are connected to the abstract node.

Here, as illustrated in FIG. 18, in order for the user 3 to view "Mt. Fuji" as the target 506 and obtain information related to "Mt. Fuji," an information acquisition function is assumed to be performed on the added tag 502 in tandem with the pointer object 508. In this case, the in-view analyzing unit 110 specifies a tag ID "1234" of the tag 502 and specifies the abstract node corresponding to the tag 502. Then, the information acquiring unit 116 traces the graphical structure via the abstract node and acquires detailed information of "Mt. Fuji." Further, a type of detailed information acquired by the information acquiring unit 116 and the number of detailed information can be arbitrarily set, but for example, in FIG. 17, detailed information of items such as a "tag ID," a "content width," a "content height," a "name," an "elevation," an "address," and a "category," is acquired.

Further, the information acquiring unit 116 outputs the detailed information of "Mt. Fuji" obtained by tracing the graphical structure to the object generating unit 112. The object generating unit 112 generates an information object 514 indicating information related to "Mt. Fuji" on the basis of the detailed information acquired by the information acquiring unit 116. Accordingly, the output image generating unit 108 can generate a display image for displaying the information object 514 in an arrangement associated with the target 506.

Figure 19:
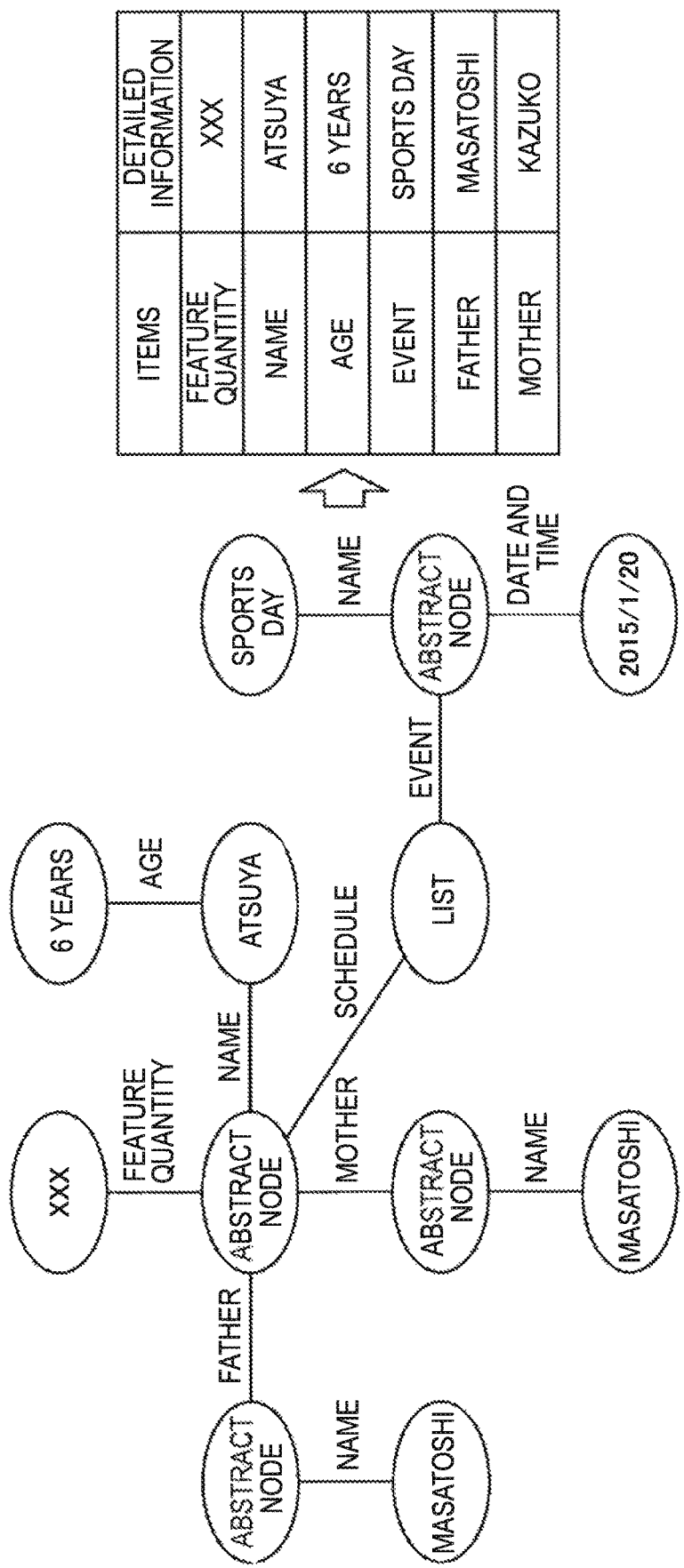
FIG. 19 is an explanatory diagram illustrating a part of a graphical structure of information for a "target" having the "name" "Atsuya."

Next, a specific example of adding information to a target identified by image recognition will be described with reference to FIGS. 19 and 20. FIG. 19 is an explanatory diagram illustrating a part of a graphical structure of information for a "target" having the "name" "Atsuya," and FIG. 20 is an explanatory diagram for describing a display image in which information is added to the target having the "name" "Atsuya."

As illustrated in FIG. 19, for example, an abstract node having the "name" "Masatoshi" is connected to an abstract node having the "name" "Atsuya" through a relation of "father." Further, an abstract node having the "name" "Kazuko" is connected to the abstract node having the "name" "Atsuya" through a relation of "mother." As described above, when the abstract nodes are relevant to each other, a graphical structure in which the abstract nodes are connected to each other can be acquired as well.

Further, a node of "list" is connected to the abstract node of "name" "Atsuya" through a relation of "schedule." As described above, the information acquiring unit 116 may acquire the privacy information and the schedule information of the user or the like stored in the information processing device 2 by tracing the graphical structure of the information in addition to the information of the general knowledge.

Figure 20:
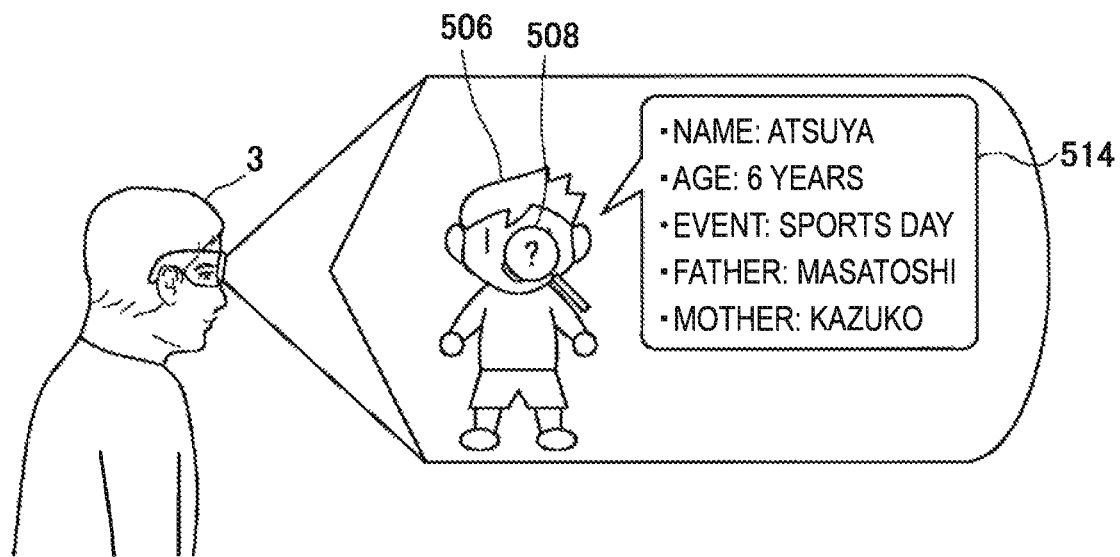
FIG. 20 is an explanatory diagram for describing a display image in which information is added to a target of having the "name" "Atsuya."

Here, as illustrated in FIG. 20, in order for the user 3 to view a person as the target 506 and obtain information related to the recognized person, the information acquisition function is assumed to be executed on the person in tandem with the pointer object 508. In this case, the in-view analyzing unit 110 calculates a feature quantity by image analysis, identifies a person included in an image, and specifies an abstract node corresponding to a person on which the user executes the information acquisition function. Then, the information acquiring unit 116 traces the graphical structure via the abstract node and acquires detailed information of the person on which the user executes the information acquisition function (that is, a person having the "name" "Atsuya"). For example, in FIG. 19, detailed information of items such as a "feature quantity," a "name," an "age," an "event," a "father," and a "mother" is acquired.

Further, the information acquiring unit 116 outputs the detailed information of the person "Atsuya" obtained by tracing the graphical structure to the object generating unit 112. The object generating unit 112 generates an information object 514 indicating information related to the person "Atsuya" on the basis of the detailed information acquired by the information acquiring unit 116. Accordingly, the output image generating unit 108 can generate a display image for displaying the information object 514 in an arrangement associated with the target 506.

Figure 21:
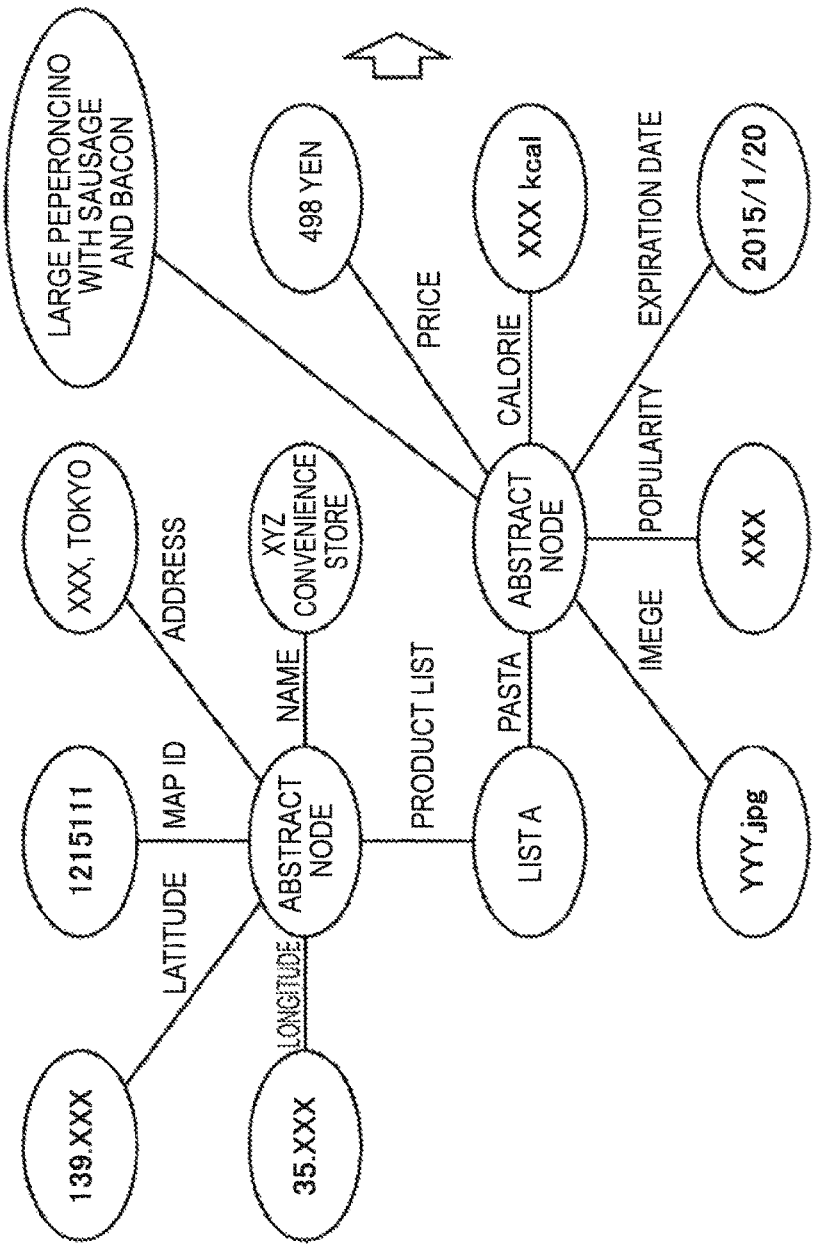
FIG. 21 is an explanatory diagram illustrating a part of a graphical structure of information for a "target" having the "name" "XYZ convenience store."

Next, a specific example of adding information to a target identified from the position information will be described with reference to FIGS. 21 and 22. FIG. 21 is an explanatory diagram illustrating a part of a graphical structure of information for a "target" having the "name" "XYZ convenience store," and FIG. 22 is an explanatory diagram for describing a display image in which information is added to the target having the "name" "XYZ convenience store."

As illustrated in FIG. 21, for example, a node of "list A" is connected to an abstract node having the "name" "XYZ convenience store" through a relation of "product list." When it is indicated by a text input from the user 3 or the like that information related to "product list" in "XYZ convenience store" is acquired, the information acquiring unit 116 may control a direction and a depth in which the graphical structure is traced on the basis of the text input from the user.

Figure 22:
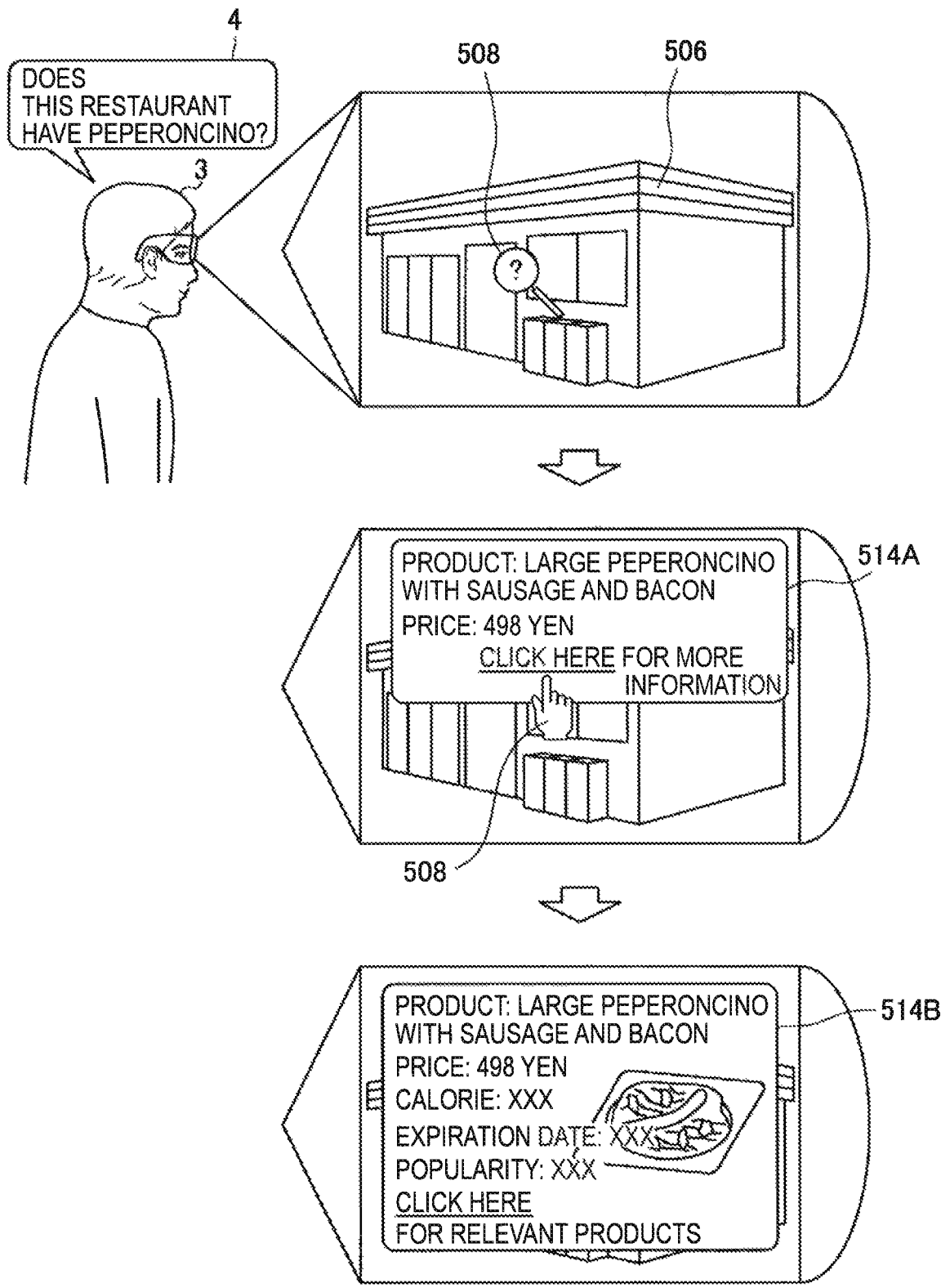
FIG. 22 is an explanatory diagram for describing a display image in which information is added to a "target" having the "name" "XYZ convenience store."

Here, as illustrated in FIG. 22, in order for the user 3 to view the convenience store as the target 506 and acquires information related to the recognized convenience store, the information acquisition function is assumed to be executed on the convenience store in tandem with the pointer object 508. In this case, the in-view analyzing unit 110 specifies position information of the convenience store serving as the target 506 on the basis of the position information of the user 3 and the direction information in which the pointer object 508 is positioned, and specifies an abstract node corresponding to the convenience store serving as the target 506. Then, the information acquiring unit 116 traces the graphical structure via the abstract node and acquires the detailed information of the convenience store on which the user 3 executes the information acquisition function.

Then, the information acquiring unit 116 outputs the detailed information of the convenience store obtained by tracing the graphical structure to the object generating unit 112. The object generating unit 112 generates an information object indicating the information related to the convenience store on which the user 3 executes the information acquisition function on the basis of the detailed information acquired by the information acquiring unit 116. Accordingly, the output image generating unit 108 can generate a display image for displaying the information object 514 in an arrangement associated with the target 506.

Further, when the user 3 executes the information acquisition function, for example, when an input is performed by a voice 4 of "Does this restaurant have Peperoncino?," the information acquiring unit 116 may acquire the detailed information of the abstract node in which "pepperoncino" is included in "name" on the basis of the input performed by the voice 4. In this case, the information acquiring unit 116 outputs the detailed information of the abstract node in which "Peperoncino" is included in "name" which is obtained by tracing the graphical structure to the object generating unit 112. The object generating unit 112 generates an information object 514A related to "Peperoncino" corresponding to the input by the voice 4 of the user 3 on the basis of the detailed information acquired by the information acquiring unit 116, and the output image generating unit 108 generates the display image for displaying the information object 514A.

Further, the object generating unit 112 may generate a link for accessing more detailed information in the information object 514A. Specifically, in FIG. 22, a phrase "click here for more information" in the information object 514A corresponds to a link for accessing more detailed information. When the user 3 selects the link, the object generating unit 112 generates an information object 514B including more detailed information, and the output image generating unit 108 generates and displays a display image for displaying the information object 514B. According to this configuration, the user 3 can acquire information according to his/her own purpose by executing a text input or an additional object operation in conjunction with execution of the information acquisition function.

In the above example, the information processing device 2 generates and displays the information object 514 when the user 3 indicates the target 506 and executes the information acquisition function, but the technology related to the present disclosure is not limited to the above example. For example, the information processing device 2 may generate and display the information object 514 when the user 3 causes the pointer object to overlap the target 506 by the gesture even when the user 3 does not separately execute the information acquisition function. Further, when the user 3 executes the information acquisition function, the information processing device 2 may generate and display the information object 514 for all the targets 506 existing within the field of view of the user 3.

Further, disclosure possibility information may be set in the information stored in the knowledge database 118. For example, information related to a personal privacy is included in detailed information related to a person. Therefore, when anyone is able to acquire detailed information of other persons, a possibility of a personal privacy being infringed is considered. In this regard, in the graphical structure, for example, it is desirable to set a node of "disclosure scope level" having a relation of "disclosure setting" (abstract node-disclosure setting-disclosure scope level) in an abstract node corresponding to a person as the disclosure possibility information and set a disclosure range of the detailed information.

As described above, when the node of "disclosure scope level" having a relation of "disclosure setting" is set in the abstract node corresponding to a person, the disclosure possibility information corresponding to "disclosure scope level" is set for all pieces of detailed information connected to the abstract node. In this case, the detailed information of the person in which the disclosure possibility information is set can be acquired only by the user specified by "disclosure scope level."

Further, when it is desired to set the disclosure possibility information in only some pieces of detailed information, for example, it is also possible to set a node of "disclosure scope level" having a relation of "disclosure setting" for nodes of some pieces of detailed information. In this case, only some pieces of detailed information in which the disclosure possibility information is set can be acquired only by the user specified by "disclosure scope level."

An example of the disclosure scope level is illustrated in FIG. 23. FIG. 23 is an explanatory diagram illustrating a specific example of the disclosure scope level of the detailed information. As illustrated in FIG. 23, the disclosure scope level may be, for example, four levels 1 to 4 in which 1 indicates the largest disclosure scope, and 4 indicates the smallest disclosure scope. In such a setting, since a higher setting includes a lower setting, for example, in addition to the users included in "disclosure scope level 2," the users included in "disclosure scope level 3" and "disclosure scope level 4" can also acquire and refer to the detailed information set to "disclosure scope level 2." Further, the detailed information in which the disclosure scope level is set to "designated" can be acquired and referred to only by the designated users.

It is desirable that the setting of the disclosure possibility information such as the disclosure scope level for the detailed information be detailed set in the detailed information of each user by each user. Further, each user may set the disclosure possibility information in detailed information of possessions such as their own house.

Here, referring back to FIG. 6, the description of the respective components of the information processing device 2 according to the present modified example will be continued.

The text acquiring unit 120 acquires the text information input by the user. Specifically, the text acquiring unit 120 acquires the text information which the user inputs on the virtual keyboard or the like and acquires text information obtained by performing speech recognition on the voice of the user.

When the text acquiring unit 120 acquires the text information obtained by performing speech recognition on the voice of the user, the text acquiring unit 120 may perform voice processing such as noise cancelation and signal amplification on the acquired voice of the user as pre-processing before performing the speech recognition process.

Further, when the user is watching content with a timeline such as a moving image, a time lag is likely to occur until the user speaks after watching the content. For this reason, when the text information is acquired from the voice of the user, the text acquiring unit 120 may set a delay time and regard that a text information acquisition timing is faster by the delay time. The delay time may be a time which is statically set in advance or may be a time which is dynamically set on the basis of user profile information such as an age, a sex, or the like of the user.

The text analyzing unit 122 performs semantic analysis on the text information acquired by the text acquiring unit 120 and acquires response information for the text information from the knowledge database 118. Specifically, the text analyzing unit 122 converts the text information acquired by the text acquiring unit 120 into a compact notation in order to correspond to a notation variant. Further, the text analyzing unit 122 searches the knowledge database 118 using the text information converted into the compact notation, and acquires the response information to a question or the like included in the text information.

More specifically, in order to absorb the presence/absence of the text information symbol input by the user, a difference between hiragana and katakana, a difference in kanji, a difference between half-width characters and full-width characters, and the like, the text analyzing unit 122 converts the text information through a unified conversion rule. Here, a character string converted through the unified conversion rule is defined as a compact notation. In order to make notations consistent and facilitate searching, it is desirable that the information stored in the knowledge database 118 be also similarly converted into a compact notation through the unified conversion rule and stored. Specific examples of the unified conversion rule include deletion of parentheses, symbols, and spaces, conversion of half-width katakana to full-width katakana, and conversion from full-width numbers and full-width alphabets to half-width numbers and half-width alphabets.

Further, h text analyzing unit 122 may dynamically change the character string of the text information in view of a possibility that the accuracy of information included in the text information will be low (a possibility that a typo, a speech error, a spelling errors, or the like will be included), finiteness of information included in the knowledge database 118 (for example, all pieces of information are not included in the knowledge database 118), or the like, increase a character string used for the search, and perform the search. Since the search performed by the text analyzing unit 122 is likely to increase an information processing amount, the text analyzing unit 122 may end the search when the number of pieces of response information acquired by the search reaches a predetermined number.

Further, the text analyzing unit 122 can acquire a score value of the information acquired by the search and output information with the high score value to the object generating unit 112 as the response information.

Next, the search on the knowledge database 118 by the text analyzing unit 122 will be described in further detail.

First, the text analyzing unit 122 dynamically changes the character string of the text information, generates search notation candidates used for search, and generates a search notation list by listing them. Then, the text analyzing unit 122 selects a database to be searched in the knowledge database 118 on the basis of a language or the like included in the text information and generates the search database list. Further, the text analyzing unit 122 acquires a semantic attribute capable of determining a domain, a genre, or the like such as a person, a place name, or music, from a phrase included in the text information.

Then, the text analyzing unit 122 searches the database on the basis of the language of the text information, the search notation list, the search database list, and the semantic attribute, and decides an extraction node. Then, the text analyzing unit 122 extracts a main node (for example, an abstract node) by tracing an equivalence relation (relation) from the extraction node and obtains a score value of the main node.

Further, the text analyzing unit 122 extracts an associated node by tracing the equivalence relation from the main node of each database. Further, the associated node corresponds to, for example, an abbreviation notation, a kana notation, alias notation, or the like of the main node. Then, the text analyzing unit 122 generates a link between the main nodes of the databases and a link between the main node and the relevant node, and connects the databases.

Subsequently, the text analyzing unit 122 links the databases in a set hierarchical order and generates an integrated graphical structure. At this time, the text analyzing unit 122 sets a main node in a database with the highest hierarchy as an entity, and sets the highest score value among the score values of the main nodes of the databases as a score value of the entity.

Further, the text analyzing unit 122 generates a predetermined amount of entities described above, sorts the entities, and outputs an entity with the highest score to the object generating unit 112.

Through this operation, the text analyzing unit 122 can acquire appropriate information as a response to a question or the like included in the text information input by the user. The response information acquired by the text analyzing unit 122 is generated in the information object by the object generating unit 112 and displayed in the display image generated by the output image generating unit 108.

Through the above configuration, the information processing device 2 according to the present modified example can secure the field of view of the user while enabling the user to perform an intuitive object operation by the gesture.

[2.2. Control of Information Processing Device]

Figure 24:
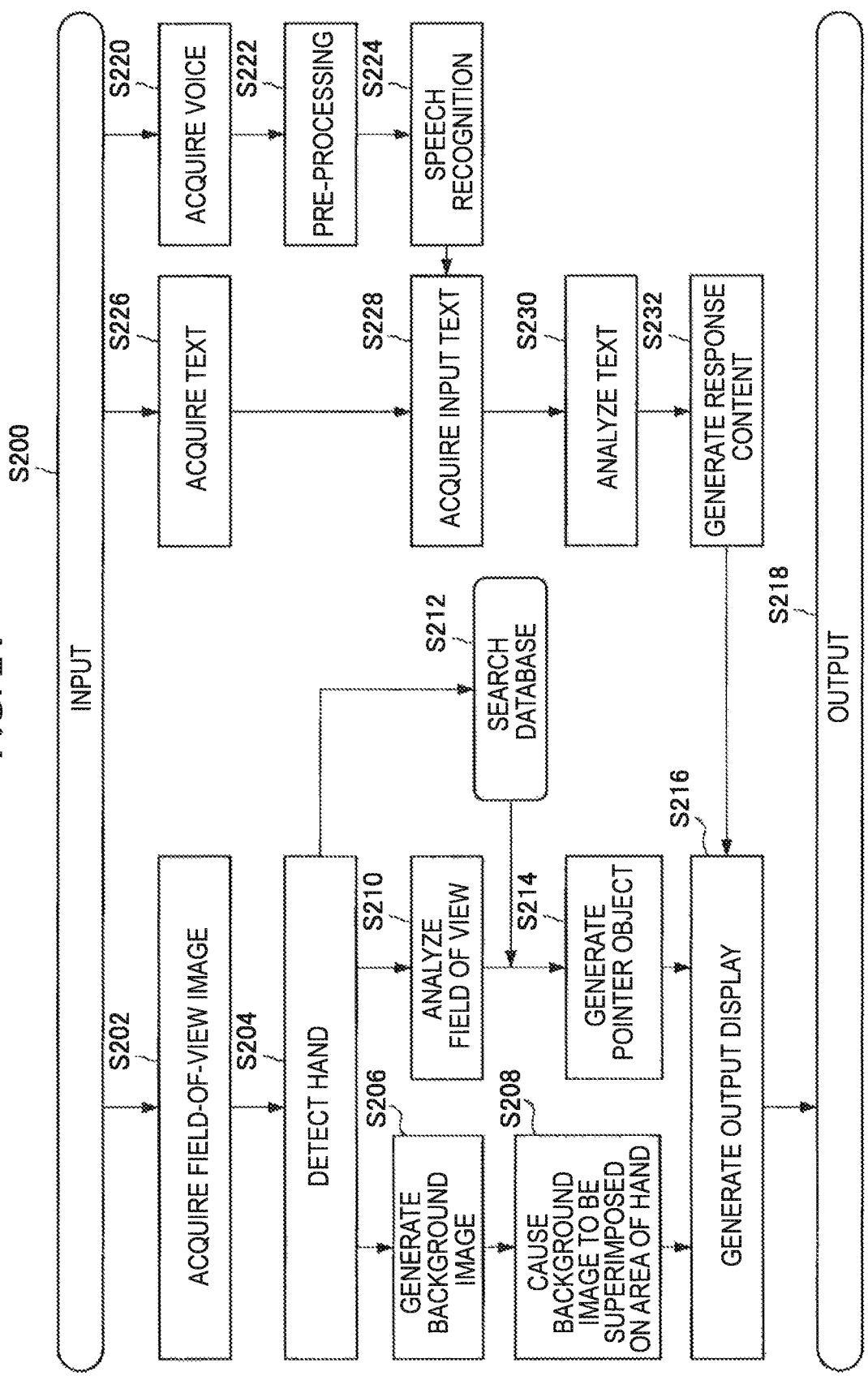
FIG. 24 is a flowchart describing a control example of each configuration of an information processing device according to the modified example.

Next, a control example of the information processing device 2 according to the present modified example described above will be described with reference to FIG. 24. FIG. 24 is a flowchart for describing a control example of the respective components of the information processing device 2 according to the present modified example.

As illustrated in FIG. 24, first, in response to an input (S200) from the imaging device or the like, the image acquiring unit 102 acquires the field-of-view image corresponding to the field of view of the user (S202). Then, the hand detecting unit 104 detects the hand of the user from the field-of-view image (S204), and the in-view analyzing unit 110 specifies the target indicated by the hand of the user (S212). At this time, the information acquiring unit 116 may acquire information related to the target indicated by the hand of the user from the knowledge database 118 as necessary and output the acquired information to the in-view analyzing unit 110. Then, the object generating unit 112 generates the pointer object indicating the target indicated by the hand of the user on the basis of the analysis performed by the in-view analyzing unit 110 (S214).

Further, the background image generating unit 106 generates the background image which is not visible to the user due to the hand of the user detected by the hand detecting unit 104 (S206), and the output image generating unit 108 generates the display image in which the generated background image is superimposed on the area occupied by the hand in the field of view of the user (S208).

On the other hand, when a text input (S200) is performed by the user, the text acquiring unit 120 acquires the input text (S226). Further, when a voice input (S200) is performed by the user, the text acquiring unit 120 acquires the voice (S220), performs preprocessing (S222), and then performs speech recognition (S224). Accordingly, the text acquiring unit 120 can acquire the input text information (S228). Then, the text analyzing unit 122 analyzes the input text information using the knowledge database 118 (S230). Further, the text analyzing unit 122 generates response content to the text information, and the object generating unit 112 generates the information object on the basis of the generated response content (S232).

Further, the output image generating unit 108 generates the display image to be viewed by the user by causing the generated pointer object and the information object to be superimposed on the display image in which the hand of the user is removed (S216) and outputs the display image to the display device (S218).

The information processing device 2 according to the present modified example can secure the field of view while enabling the user to perform an intuitive object operation by the gesture by controlling the respective components in accordance with the above-described flow.

[2.3. Display Example by Information Processing Device]

Next, the field of view which the user 3 can view using the information processing device 2 according to the present modified example will be described with reference to FIGS. 25 to 31B. FIGS. 25 to 31B are explanatory diagrams for describing the field of view which the user 3 can view using the information processing device 2 according to the present modified example.

Figure 25:
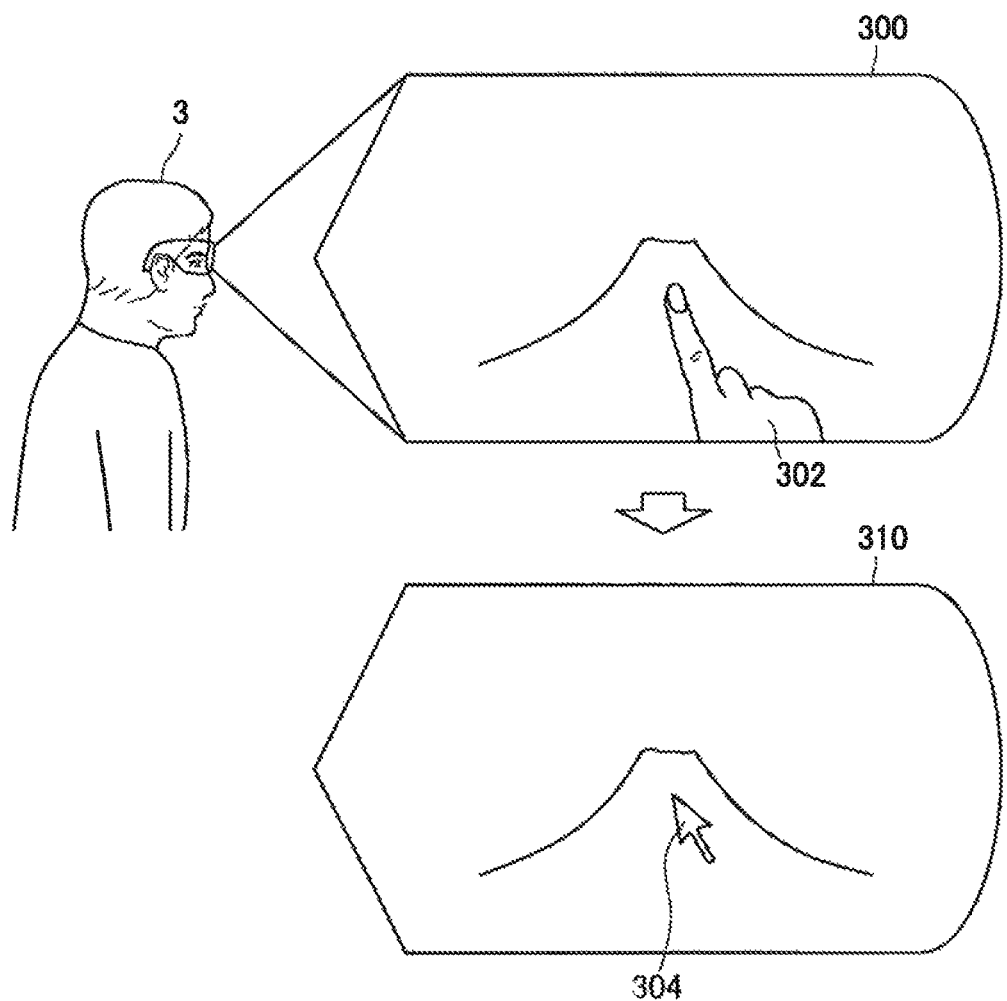
FIG. 25 is an explanatory diagram illustrating a field of view viewed by the user using the information processing device according to the modified example.

As illustrated in FIG. 25, when the user 3 indicates a target in a field of view 300 by a gesture by a hand 302, the information processing device 2 generates a display image in which the background image is superimposed on an area in which the hand 302 exists, and a pointer object 304 is displayed on a point indicated by the hand. Accordingly, the hand 302 of the user 3 does not fall within a field of view 310 viewed by the user 3, and the pointer object 304 is displayed instead. Therefore, the user can secure the field of view even when the hand 302 fails within the field of view 300.

Further, the user 3 can also perform various types of operations on the target and the object in the field of view by the gesture. For example, as illustrated in FIG. 26A, the user 3 can select an operation to be executed from a menu object 306 in which various kind of operations are selectable and execute various kinds of operations. At this time, the image of the pointer object 304 may be changed in accordance with to the selected operation. For example, in FIG. 26A, the pointer object 304 is changed to an image 304A of the hand selecting the target, and when the text input function is selected, the pointer object 304 is changed to an image 304B of a pencil indicating that the text input function is executed.

Figure 26B:
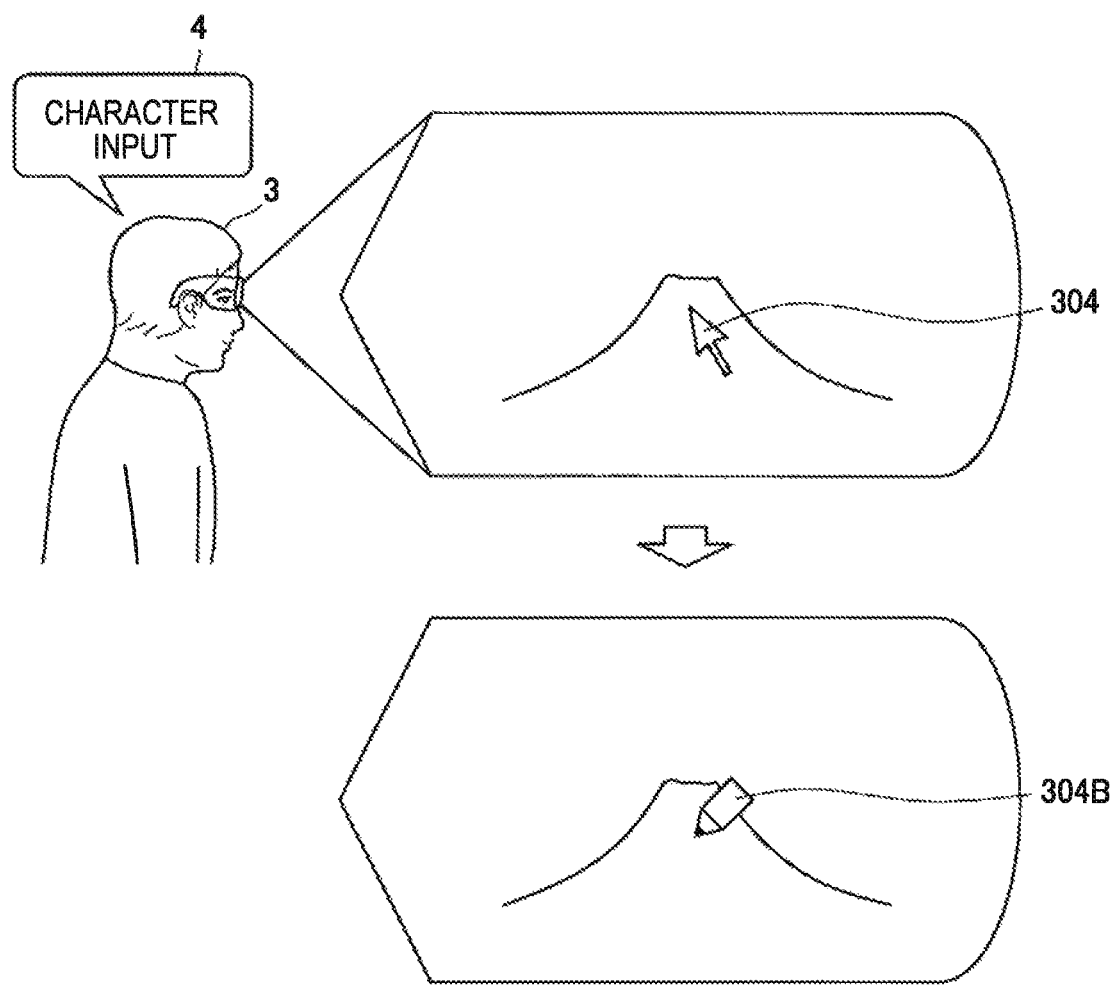
FIG. 26B is an explanatory diagram illustrating a field of view viewed by the user using the information processing device according to the modified example.

The selection of various kinds of operations executed by the gesture of the user 3 may be performed by a voice 4 input from the user 3 as illustrated in FIG. 26B. For example, the information processing device 2 may change the pointer object 304 to an image 304B of a pencil indicating that the text input function is executable in accordance with the voice 4 of "character input" from the user 3.

Figure 26C:
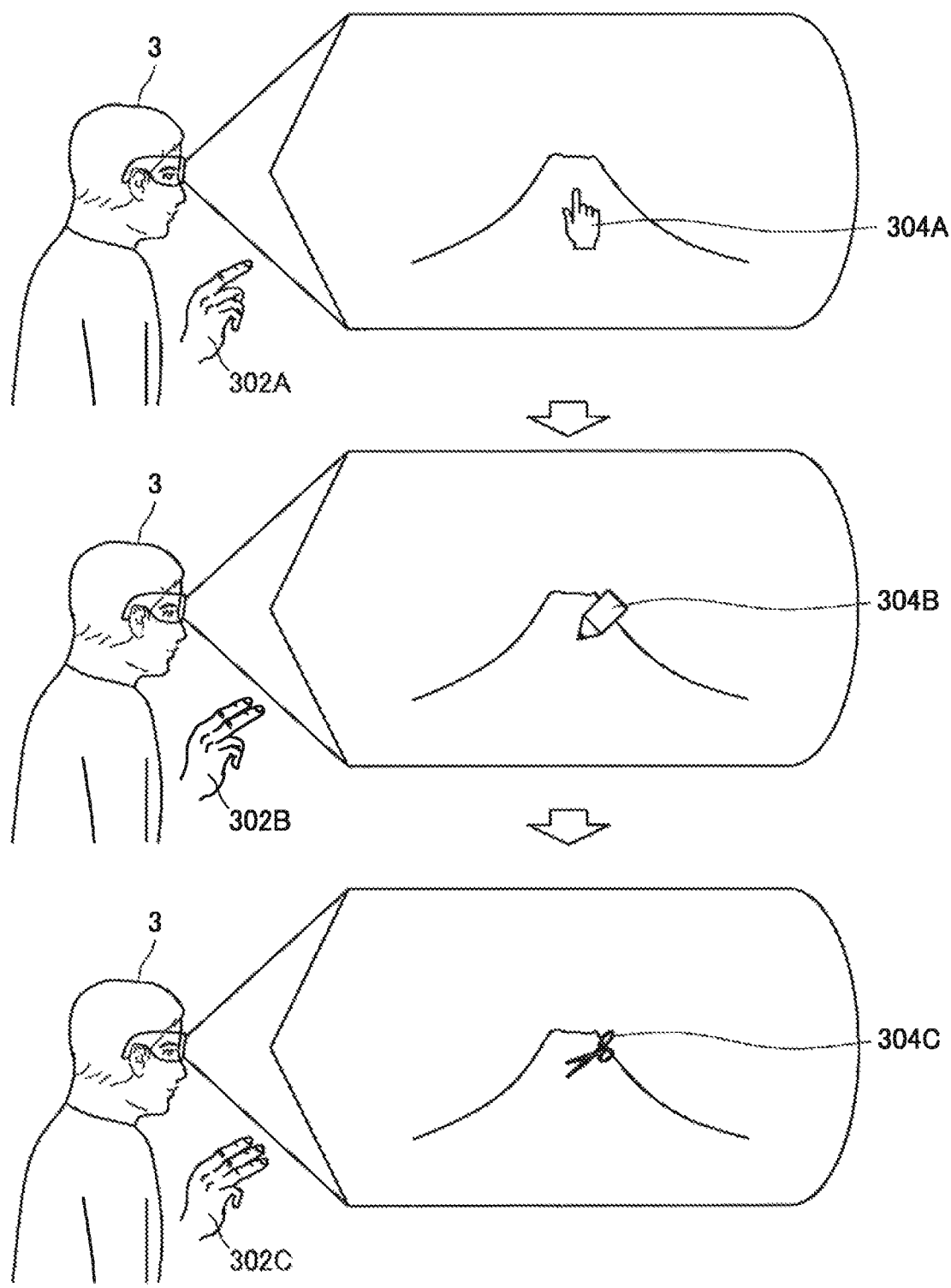
FIG. 26C is an explanatory diagram illustrating a field of view viewed by the user using the information processing device according to the modified example.

Further, various kinds of operations executed on the gesture of the user 3 may be switched in accordance with a shape of the hand of the user 3 as illustrated in FIG. 26C. For example, the information processing device 2 may switch various kinds of operations so that a target selection function is executed when the user 3 makes a gesture by a hand 302A in which the user 3 extends one finger, a text input function is executed when the user 3 makes a gesture by a hand 302B in which the user 3 extends two fingers, and a range selection function is executed when the user 3 makes a gesture by a hand 302C in which the user 3 extends three fingers.

Further, the image of the pointer object may be changed in accordance with the function executed by gesture as described above. For example, as illustrated in FIG. 26C, the pointer object 304 may be changed to the image 304A of the hand indicating that the selection function of target is executable, may be changed to the image 304B of the pencil indicating that the text input function is executable, or may be changed to the image 304C of the scissors indicating that the range selection function is executable.

Here, as illustrated in FIG. 27A, when the user 3 adds a text to the display image as the information object using the text input function, the input text may be added to the display image in a format of horizontal writing starting from the position of the pointer object of the image 304B of the pencil. For example, in FIG. 27A, an information object 307 of "Mt. Fuji is beautiful" is added to the display image through the input by the voice 4 from the user 3.

Further, a display format of the information object 307 including the input text is not limited to the horizontal writing display illustrated in FIG. 27A. For example, as illustrated in FIG. 27B, when a drag operation using the pointer object of the image 304B of the pencil is performed, the information object 307 of "Mt. Fuji is beautiful" by the input of the voice 4 may be displayed on the area on which the drag operation is performed. In this ease, the information object 307 is added to the display image in the direction designated by the user 3.

Figure 27C:
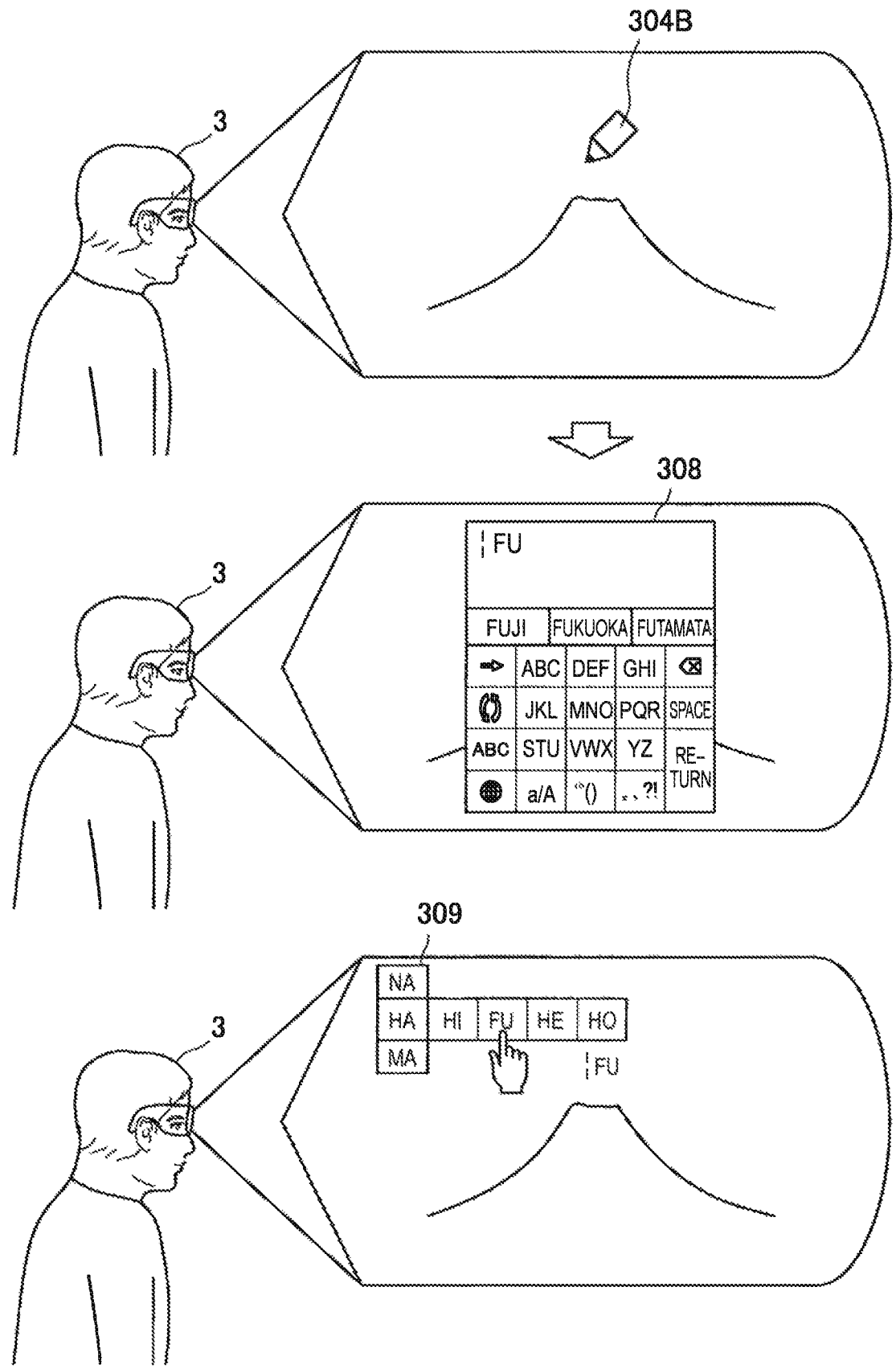
FIG. 27C is an explanatory diagram illustrating a field of view viewed by the user using the information processing device according to the modified example.

In the above example, an input method by voice has been described as a method of a text input by the user 3, but the text input may be performed by any other method. For example, as illustrated in FIG. 27C, the information processing device 2 may cause a flick-inputable virtual keyboard 308 to be displayed in the field of view of the user 3 and cause the user 3 to perform text input by the virtual keyboard 308. Further, the information processing device 2 may cause a cross type virtual keyboard 309 to be displayed in the field of view of the user 3 and cause the user 3 to perform the text input by the virtual keyboard 309.

Figure 28:
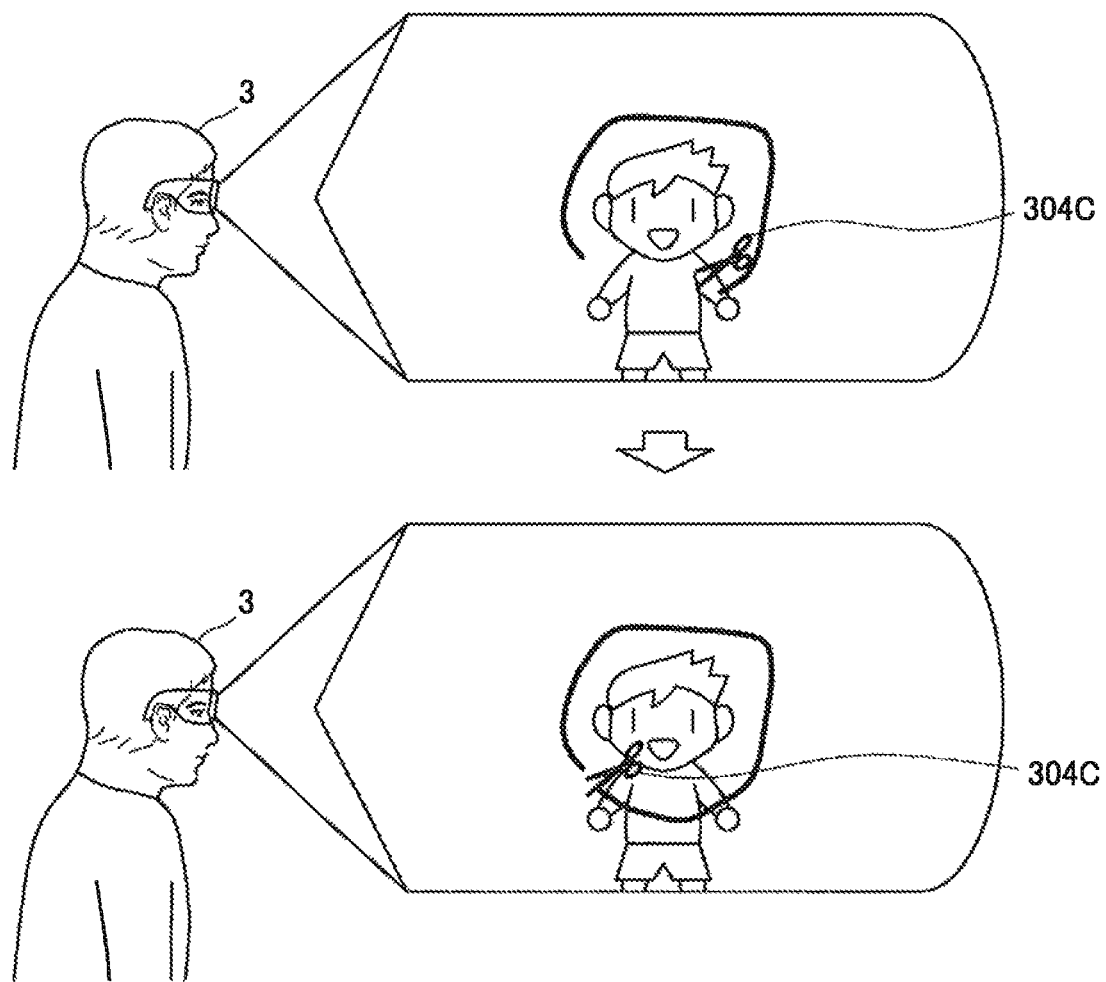
FIG. 28 is an explanatory diagram illustrating a field of view viewed by the user using the information processing device according to the modified example.

Further, as illustrated in FIG. 28, the user 3 can designate a range within the field of view by the gesture and perform various kinds of operations on the target within the designated range. For example, in FIG. 28, range selection by a pointer object of an image 304C of scissors is performed so as to surround a face of a person detected in the field of view of the user 3. The range selection by the pointer object of the image 304C of the scissors may be performed by a closed curve in which a start point and an end point coincide with each other or may be made by an open curve in which a start point and an end point do not coincide with each other. When the range selection is performed by the open curve, the information processing device 2 can connects the start point and the end point of the closed curve designated by the user 3, convert the open curve into the closed curve, and specify a range designated by the user 3.

Figure 29A:
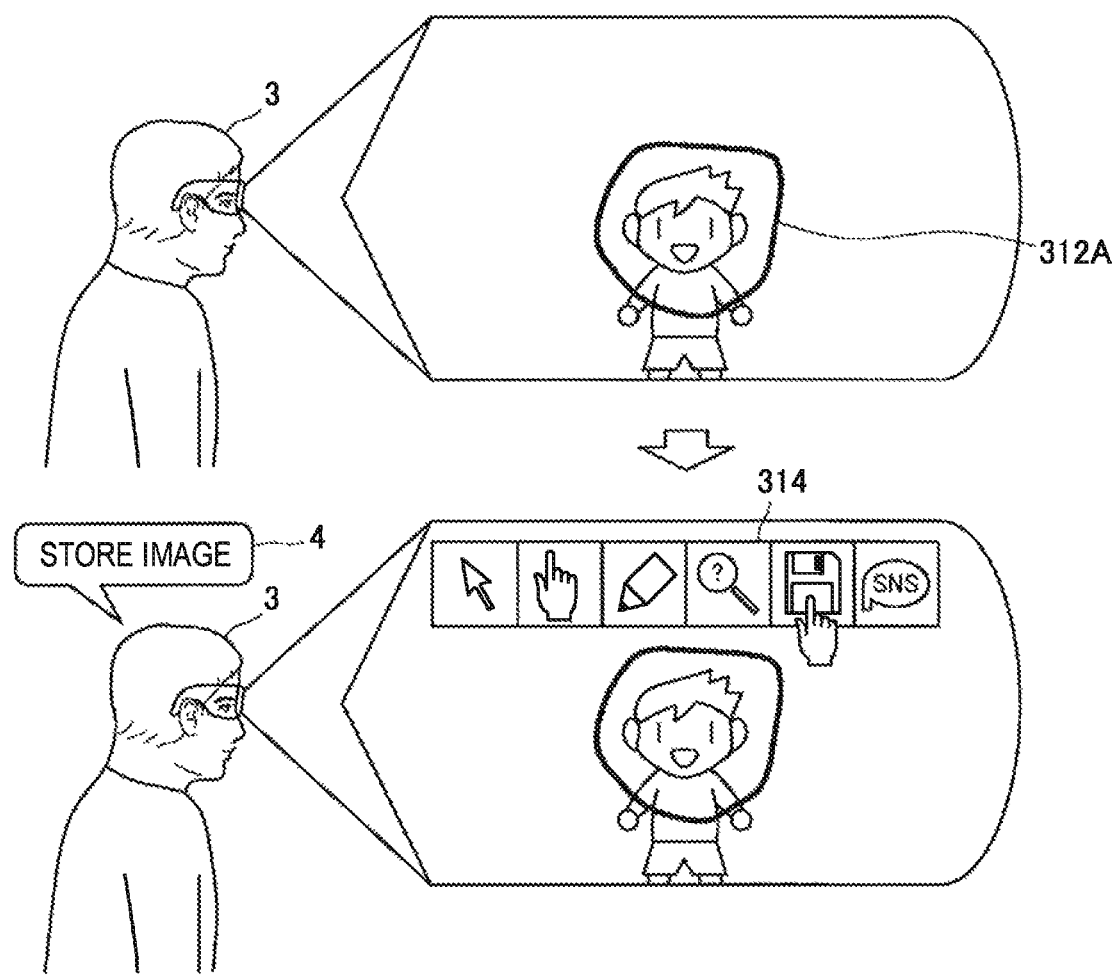
FIG. 29A is an explanatory diagram illustrating a field of view viewed by the user using the information processing device according to the modified example.

As illustrated in FIG. 29A, it is possible to execute a function of storing, for example, an image being viewed by the user 3 within the range designated by a curve 312A designated by the range selection function. Further, in FIG. 29A, the user 3 can instruct the information processing device 2 to execute the image storage function by the voice 4. It will be appreciated that the user 3 may instruct the information processing device 2 to select a function to be executed in the range designated by the curve 312A from a menu object 314.

Figure 29B:
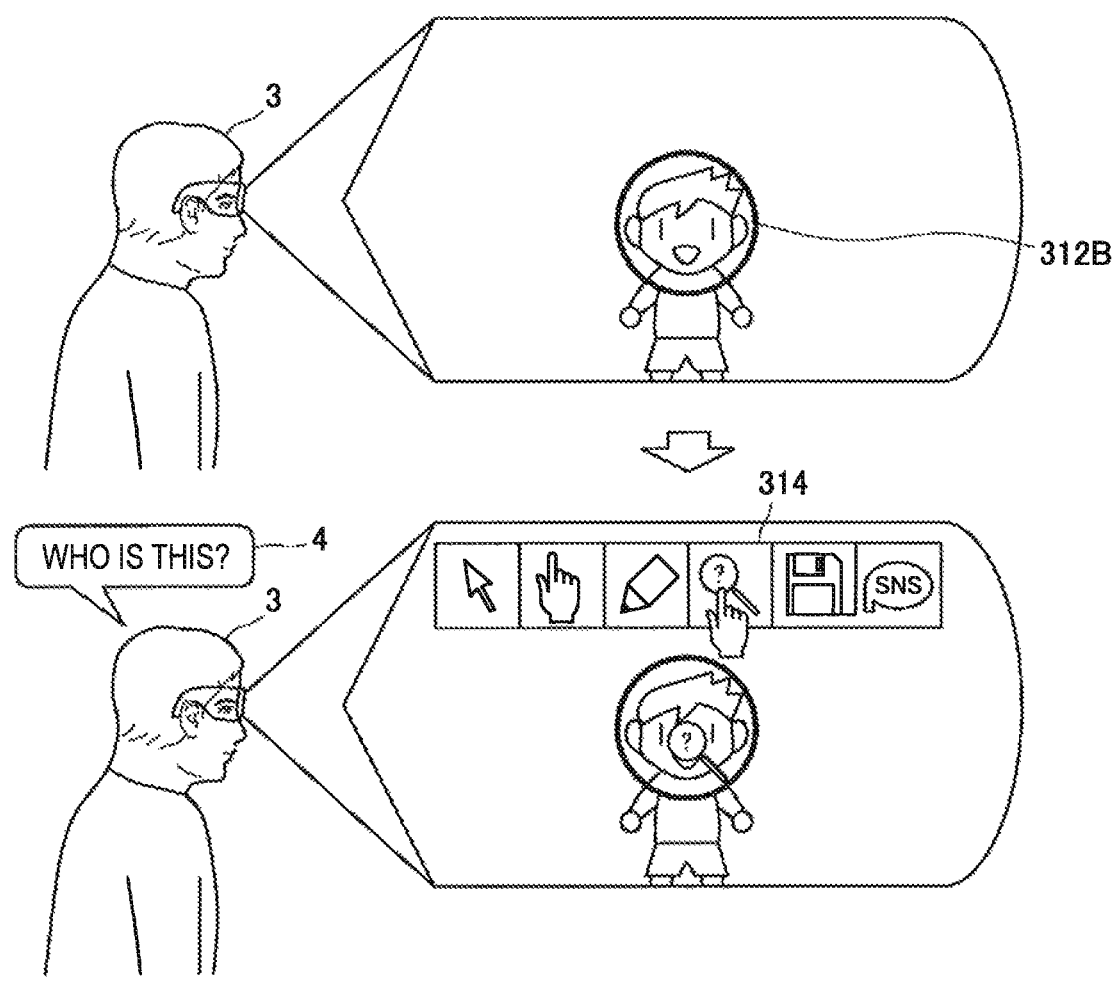
FIG. 29B is an explanatory diagram illustrating a field of view viewed by the user using the information processing device according to the modified example.

As illustrated in FIG. 29B, the information processing device 2 may perform correction by automatically fitting the curve designated through the range selection function by the user 3 to a predetermined diagram such as a circle, a square, a rectangle, and a regular polygon. In this case, the user 3 can perform appropriate range selection even when it is difficult to designate the range accurately by the gesture. In FIG. 29B, the user 3 instructs the information processing device 2 to execute an information acquisition function related to a person included in the designated range by the voice 4.

Further, as illustrated in FIG. 30, when a plurality of hands 431 and 432 of the user 3 fall within the field of view, for example, the information processing device 2 may display a content object 434 such as a map to be superimposed on one hand 431 and display a pointer object 436 to be superimposed ahead of the other hand 432. In this case, the user 3 can operate the content object 434 displayed on one hand 431 through the pointer object 436 operated by the other hand 432.

Figure 31A:
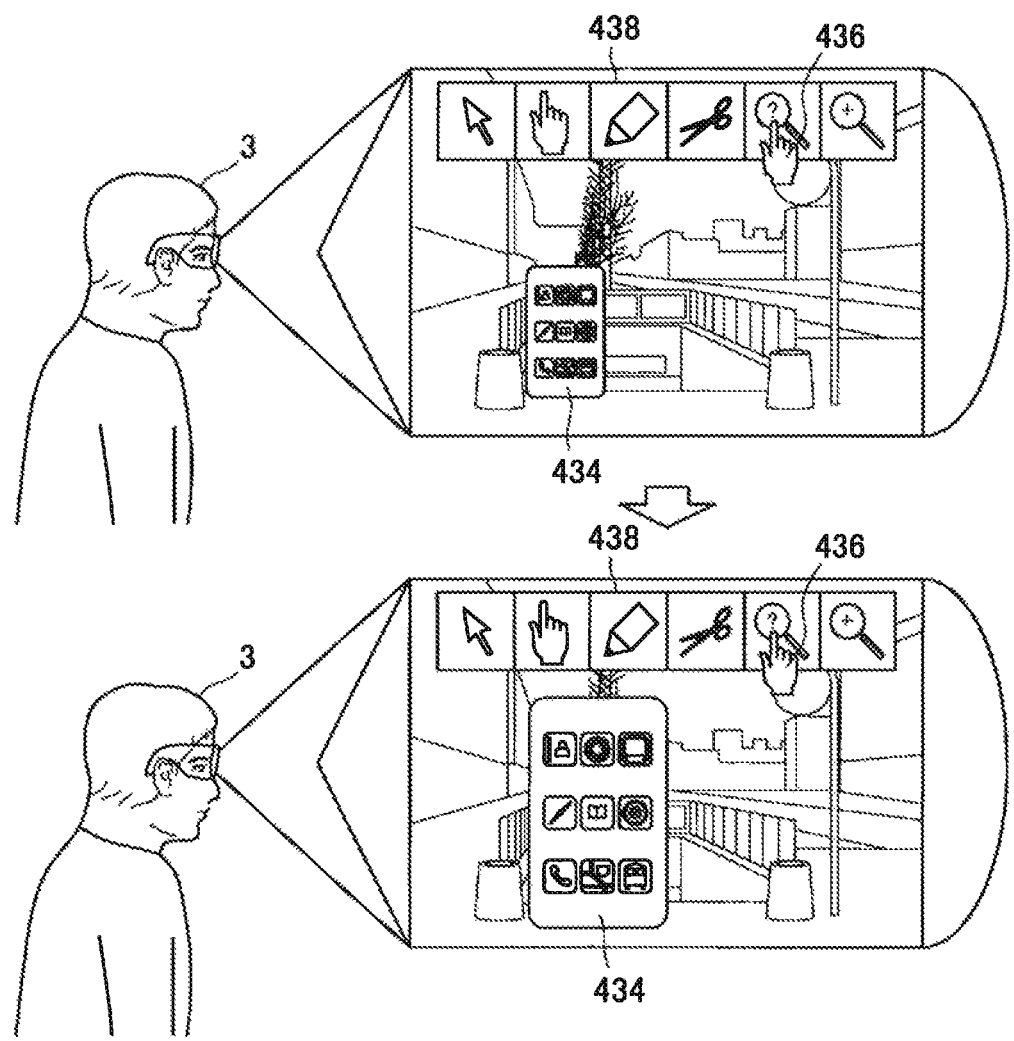
FIG. 31A is an explanatory diagram illustrating a field of view viewed by the user using the information processing device according to the modified example.
Figure 31B:
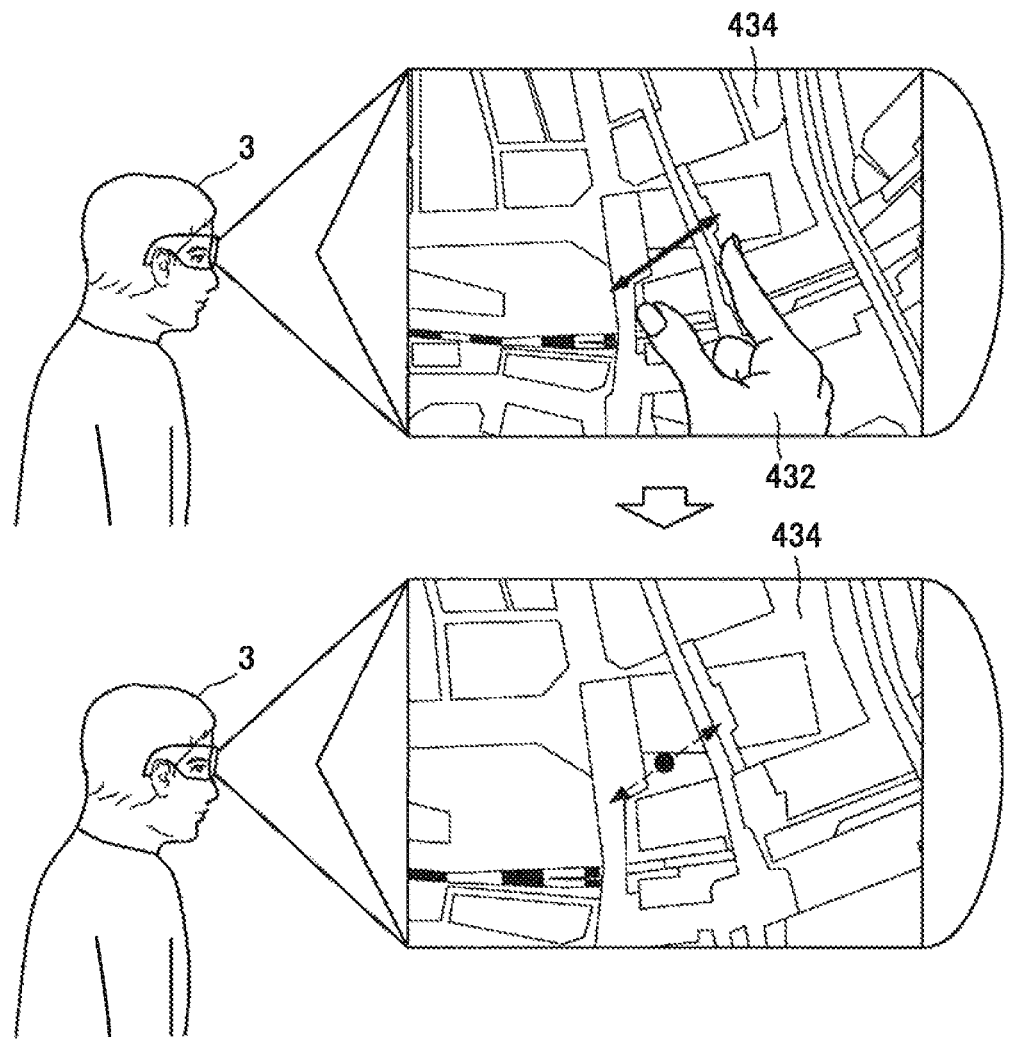
FIG. 31B is an explanatory diagram illustrating a field of view viewed by the user using the information processing device according to the modified example.

Further, enlargement or reduction of the content object 434 displayed in the field of view viewed by the user 3 and enlargement or reduction of the content in the content object 434 can arbitrarily be performed by the operation of the user 3. For example, as illustrated in FIG. 31A, the user 3 may enlarge or reduce the content object 434 by operating a pointer object 436 by the gesture and performing an enlargement function or a reduction function in a menu object 438. Further, for example, as illustrated in FIG. 31B, the user 3 may enlarge or reduce the content in the content object 434 by performing a pinch-in or pinch-out gesture on the content object 434 by a hand 432.

Thus, the specific example of the field of view which the user 3 can view by superimposing the display image generated by the information processing device 2 has been described in detail.

3. Hardware Configuration

Next, a hardware configuration of the information processing device 1 according to one embodiment of the present disclosure will be described with reference to FIG. 32. FIG. 32 is a block diagram illustrating an example of the hardware configuration of the information processing device 1 according to the present embodiment. The information processing executed by the information processing device 1 according to the present embodiment is implemented by cooperation of software and hardware.

As illustrated in FIG. 32, the information processing device 1 includes, for example, a Central Processing Unit (CPU) 602, a Read Only Memory (ROM) 604, a Random Access Memory (RAM) 606, a bridge 610, internal buses 608 and 612, an interface 614, an input device 616, an output device 618, a storage device 620, a drive 622, a connection port 624, and a communication device 626.

The CPU 602 functions as an operation processing device and a control device, and controls an overall operation of the information processing device 1 according to a program stored in the ROM 604 or the like. The RUM 604 stores programs and computation parameters used by the CPU 602, and the RAM 606 temporarily stores a program to be used in the execution of the CPU 602, parameters that are appropriately changed in the execution, and the like.

The CPU 602, the ROM 604, and the RAM 606 are connected to one another via the bridge 610, the internal buses 608 and 612, or the like. Further, the CPU 602, the ROM 604, and the RAM 606 are also connected to the input device 616, the output device 618, the storage device 620, the drive 622, the connection port 624, and the communication device 626 via the interface 614.

The input device 616 includes an input device to which information is inputted such as a touch panel, a keyboard, a button, a microphone, a switch, or a lever, an input control circuit that generates an input signal on the basis of the input of the user and outputs the input signal to the CPU 602, and the like. The input device 616 may also include various kinds of sensors such as a vibration sensor, an acceleration sensor, a GNSS sensor, a geomagnetic sensor, a barometric sensor, and a temperature sensor.

The output device 618 includes, for example, a display device such as a liquid crystal display (LCD) device, an organic electroluminescence display (OLED) device, or a lamp and an audio output device such as a speaker or a headphone. For example, the display device displays the generated image, and the audio output device converts audio data or the like into a sound and outputs the sound.

The storage device 620 is a data storage device configured as an example of a storage unit of the information processing device 1. The storage device 620 may include a storage medium, a storage device that stores data in a storage medium, a reading device that reads data from a storage medium, and a deleting device that deletes stored data.

The drive 622 is a storage medium reader/writer. The drive 622 reads information stored in a removable storage medium such as a semiconductor memory inserted in the drive 622, and outputs the information to the RAM 606. Further, the drive 622 is also able to write information in a removable storage medium.

The connection port 624 is a connection interface configured with a connection port for connecting an externally connected device such as a universal serial bus (USB) port or an optical audio terminal.

The communication device 626 is a communication interface configured with a communication device or the like for a connection to a network 7 such as a public line network or a dedicated line network. Further, the communication device 626 may be a wired or wireless LAN support communication device or a cable communication device that performs wired cable communication.

Further, it is also possible to create a computer program causing another information processing device to execute the same functions as those constituting the information processing device 1 according to the present embodiment in hardware such as a CPU, a ROM, and a RAM. A storage medium including the computer program stored therein is also provided.

4. Conclusion

As described above, according to the information processing device according to the present embodiment, even when the hand of the user fall within the field of view, it is possible to generate a display image in which the background image is superimposed on the hand falling within it, cause the user to view the display image, and secure the field of view of the user.

Further, according to the information processing device according to the present embodiment, the user can intuitively operate the object displayed in the field of view by the gesture.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the glasses-type wearable terminal has been described as an example of the information processing device 1, but the technology related to the present disclosure is not limited to the above example. For example, the information processing device 1 may be a head mount type wearable terminal device or a video see-through type wearable terminal device. The technology related to the present disclosure can also be applied to the terminals device.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an image acquiring unit configured to acquire a field-of-view image corresponding to a field of view of a user;

a hand detecting unit configured to detect a hand of the user from the field-of-view image;

a background image generating unit configured to generate a background image of a background which is not visible to the user due to the hand on the basis of the field-of-view image; and an output image generating unit configured to generate a display image in which the background image is superimposed on an area occupied by the hand in the field of view of the user.

(2)

The information processing device according to (1), further including, an object generating unit configured to generate a pointer object indicating a point indicated by the hand.

(3)

The information processing device according to (2), in which the object generating unit changes the pointer object to be generated on the basis of a function executed by a gesture using the hand.

(4)

The information processing device according to (2) or (3), further including, a line-of-sight detecting unit configured to detect a line of sight of the user, in which the object generating unit does not generate the pointer object in the case where a line-of-sight position of the user is not included in a predetermined first area set around the pointer object.

(5)

The information processing device according to (4), in which the object generating unit generates the pointer object whose transparency is changed on the basis of a distance between the line-of-sight position of the user and the pointer object in the case where the line-of-sight position of the user is included in a predetermined second area set around the first area.

(6)

The information processing device according to any one of (2) to (5), further including, an in-view analyzing unit configured to determine a target indicated by the user from among targets in a search range based on position information of the user and direction information indicated by the hand of the user.

(7)

The information processing device according to (6), in which the search range increases as a distance from the user increases.

(8)

The information processing device according to any one of (2) to (7), further including, an information acquiring unit configured to acquire detailed information related to a target indicated by the hand of the user, in which the object generating unit generates an information object for displaying the detailed information in association with the target.

(9)

The information processing device according to (8), in which the detailed information related to the target includes disclosure possibility information, and the information acquiring unit acquires the detailed information related to the target on the basis of the disclosure possibility information.

(10)

The information processing device according to any one of (1) to (9), in which the output image generating unit generates an image in which the background image is superimposed on a part of an area occupied by the hand in the field of view of the user.

(11)

The information processing device according to any one of (1) to (10), in which the output image generating unit generates a display image in which a content object is superimposed at least on an area occupied by one of the hands in the field of view of the user.

(12)

An information processing method, including:

acquiring a field-of-view image corresponding to a field of view of a user;

detecting a hand of the user from the field-of-view image;

generating a background image of a background which is not visible to the user due to the hand on the basis of the field-of-view image; and generating a display image in which the background image is superimposed on an area occupied by the hand in the field of view of the user.

(13)

A program causing a computer to function as:

an image acquiring unit configured to acquire a field-of-view image corresponding to a field of view of a user;

a hand detecting unit configured to detect a hand of the user from the field-of-view image;

a background image generating unit configured to generate a background image of a background which is not visible to the user due to the hand on the basis of the field-of-view image; and an output image generating unit configured to generate a display image in which the background image is superimposed on an area occupied by the hand in the field of view of the user.

REFERENCE SIGNS LIST 1, 2 information processing device
102 image acquiring unit
104 hand detecting unit
106 background image generating unit
108 output image generating unit
110 in-view analyzing unit
112 object generating unit
114 line-of-sight detecting unit
116 information acquiring unit
118 knowledge database
120 text acquiring unit
122 text analyzing unit

The invention claimed is:

1. An information processing device, comprising:
an image acquiring unit configured to acquire a field-of-view image corresponding to a field of view of a user from a plurality of imaging devices;
a hand detecting unit configured to detect a hand of the user from the field-of-view image;
a background image generating unit configured to generate a background image of a background which is not visible to the user due to the hand on the basis of the field-of-view image acquired from the plurality of imaging devices; and
an output image generating unit configured to generate a display image in which the background image is superimposed on all areas occupied by the hand in the field of view of the user in order to remove the hand from the field of view of the user,
wherein the plurality of imaging devices used to generate the background image includes at least three imaging devices located at different positions in a nonlinear configuration of the at least three imaging devices,
wherein each respective imaging device of the at least three imaging devices acquires a respective image that overlaps with the field-of-view image corresponding to the field of view of the user and overlaps with at least two images acquired by at least two other imaging devices of the at least three imaging devices, and
wherein the image acquiring unit, the hand detecting unit, the background image generating unit, and the output image generating unit are each implemented via at least one processor.

2. The information processing device according to claim 1, further comprising,
an object generating unit configured to generate a pointer object indicating a point indicated by the hand,
wherein the object generating unit is implemented via at least one processor.

3. The information processing device according to claim 2,
wherein the object generating unit changes the pointer object to be generated on the basis of a function executed by a gesture using the hand.

4. The information processing device according to claim 2, further comprising,
a line-of-sight detecting unit configured to detect a line of sight of the user,
wherein the object generating unit does not generate the pointer object in the case where a line-of-sight position of the user is not included in a predetermined first area set around the pointer object, and
wherein the line-of-sight detecting unit is implemented via at least one processor.

5. The information processing device according to claim 4,
wherein the object generating unit generates the pointer object whose transparency is changed on the basis of a distance between the line-of-sight position of the user and the pointer object in the case where the line-of-sight position of the user is included in a predetermined second area set around the first area.

6. The information processing device according to claim 2, further comprising,
an in-view analyzing unit configured to determine a target indicated by the user from among targets in a search range based on position information of the user and direction information indicated by the hand of the user,
wherein the in-view analyzing unit is implemented via at least one processor.

7. The information processing device according to claim 6,
wherein the search range increases as a distance from the user increases.

8. The information processing device according to claim 2, further comprising,
an information acquiring unit configured to acquire detailed information related to a target indicated by the hand of the user,
wherein the object generating unit generates an information object for displaying the detailed information in association with the target, and
wherein the information acquiring unit is implemented via at least one processor.

9. The information processing device according to claim 8,
wherein the detailed information related to the target includes disclosure possibility information, and wherein the information acquiring unit acquires the detailed information related to the target on the basis of the disclosure possibility information.

10. The information processing device according to claim 1, wherein the output image generating unit generates an image in which the background image is superimposed on each part of the areas occupied by the hand in the field of view of the user.

11. The information processing device according to claim 1, wherein the output image generating unit generates the display image in which a content object is superimposed at least on an area occupied by the hand in the field of view of the user.

12. The information processing device according to claim 1, wherein the plurality of imaging devices are mounted in the imaging processing device at the different positions.

13. The information processing device according to claim 1, wherein the plurality of imaging devices includes at least four imaging devices.

14. The information processing device according to claim 13, wherein the at least four imaging devices include an upper side imaging device, a lower side imaging device, a left side imaging device, and a right side imaging device.

15. The information processing device according to claim 1, wherein the respective image acquired by each respective imaging device includes the detected hand of the user.

16. An information processing method, comprising:
acquiring a field-of-view image corresponding to a field of view of a user from a plurality of imaging devices;
detecting a hand of the user from the field-of-view image;
generating a background image of a background which is not visible to the user due to the hand on the basis of the field-of-view image acquired from the plurality of imaging devices; and
generating a display image in which the background image is superimposed on all areas occupied by the hand in the field of view of the user in order to remove the hand from the field of view of the user,
wherein the plurality of imaging devices used to generate the background image includes at least three imaging devices located at different positions in a nonlinear configuration of the at least three imaging devices, and
wherein each respective imaging device of the at least three imaging devices acquires a respective image that overlaps with the field-of-view image corresponding to the field of view of the user and overlaps with at least two images acquired by at least two other imaging devices of the at least three imaging devices.

17. A non-transitory computer-readable medium having embodied thereon a program, which when executed by a computer causes the computer to execute a method, the method comprising:
acquiring a field-of-view image corresponding to a field of view of a user from a plurality of imaging devices;
detecting a hand of the user from the field-of-view image;
generating a background image of a background which is not visible to the user due to the hand on the basis of the field-of-view image acquired from the plurality of imaging devices; and
generating a display image in which the background image is superimposed on all areas occupied by the hand in the field of view of the user in order to remove the hand from the field of view of the user,
wherein the plurality of imaging devices used to generate the background image includes at least three imaging devices located at different positions in a nonlinear configuration of the at least three imaging devices, and
wherein each respective imaging device of the at least three imaging devices acquires a respective image that overlaps with the field-of-view image corresponding to the field of view of the user and overlaps with at least two images acquired by at least two other imaging devices of the at least three imaging devices.

* * * * *